US011309988B2

(12) United States Patent
Marinier et al.

(10) Patent No.: US 11,309,988 B2
(45) Date of Patent: Apr. 19, 2022

(54) SYSTEM AND METHOD FOR ADAPTIVE MODULATION

(71) Applicant: INTERDIGITAL PATENT HOLDINGS, INC., Wilmington, DE (US)

(72) Inventors: Paul Marinier, Brossard (CA); J. Patrick Tooher, Montreal (CA); Ghyslain Pelletier, Montreal (CA); Marian Rudolf, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/880,972

(22) Filed: May 21, 2020

(65) Prior Publication Data

US 2020/0287657 A1    Sep. 10, 2020

Related U.S. Application Data

(63) Continuation of application No. 15/950,388, filed on Apr. 11, 2018, now Pat. No. 10,693,584, which is a
(Continued)

(51) Int. Cl.
*H04W 72/04* (2009.01)
*H04L 1/00* (2006.01)
(Continued)

(52) U.S. Cl.
CPC .......... *H04L 1/0016* (2013.01); *H04L 1/0003* (2013.01); *H04L 1/0026* (2013.01);
(Continued)

(58) Field of Classification Search
CPC ... H04W 72/042; H04W 72/12; H04W 36/30; H04L 1/0016; H04L 1/0003; H04L 1/0026; H04L 1/18; H04L 27/0008; H04L 27/28
See application file for complete search history.

(56) References Cited

U.S. PATENT DOCUMENTS 9,413,576 B2    8/2016 Srinivasa et al.
2008/0080364 A1    4/2008 Barak et al.
(Continued)

FOREIGN PATENT DOCUMENTS

CN    101112111 A    1/2008
CN    101873294 A    10/2010
(Continued)

OTHER PUBLICATIONS

3rd Generation Partnership Project (3GPP), R1-084640, "MCS Handling for DwPTS", CMCC, CATT, RITT, Huawei, Vodafone, Motorola, 3GPP TSG-RAN1 Meeting #55, Prague, Czech Republic, Nov. 10-14, 2008, 10 pages.
(Continued)

*Primary Examiner* — Wei Zhao
(74) *Attorney, Agent, or Firm* — Flaster Greenberg, P.C.

(57) ABSTRACT

Systems, methods, and/or techniques for improving downlink spectrum efficiency may be disclosed. For example, a higher order modulation (HOM) transmission may be provided to a device. The higher order modulation transmission may be configured to be indicated by the network or a device. Additionally, multiple modulation and coding scheme (MCS) tables, transport block size (TBS) tables, and/or channel quality index (CQI) tables may be provided to support the higher order modulation transmission.

20 Claims, 6 Drawing Sheets

Related U.S. Application Data continuation of application No. 14/760,373, filed as application No. PCT/US2014/011180 on Jan. 11, 2014, now Pat. No. 9,973,297.

(60) Provisional application No. 61/857,397, filed on Jul. 23, 2013, provisional application No. 61/821,189, filed on May 8, 2013, provisional application No. 61/751,557, filed on Jan. 11, 2013.

(51) Int. Cl.
*H04L 27/00* (2006.01)
*H04L 1/18* (2006.01)

(52) U.S. Cl.
CPC ....... *H04L 27/0008* (2013.01); *H04W 72/042* (2013.01); *H04L 1/1854* (2013.01)

(56) References Cited

U.S. PATENT DOCUMENTS

| | | |
|---|---|---|
| 2008/0189360 A1 | 8/2008 | Kiley et al. |
| 2009/0010211 A1 | 1/2009 | Sumasu et al. |
| 2010/0027595 A1 | 2/2010 | Takada et al. |
| 2010/0080176 A1* | 4/2010 | Maas ............ H04L 1/0026 370/329 |
| 2010/0195614 A1 | 8/2010 | Nimbalker et al. |
| 2011/0002290 A1 | 1/2011 | Kim et al. |
| 2011/0235599 A1* | 9/2011 | Nam ............ H04L 5/0055 370/329 |
| 2013/0286881 A1 | 10/2013 | Ding et al. |
| 2013/0294318 A1 | 11/2013 | Amerga et al. |
| 2013/0322398 A1* | 12/2013 | Jang ............ H04L 1/0026 370/329 |
| 2015/0195819 A1 | 7/2015 | Kwon et al. |

FOREIGN PATENT DOCUMENTS

| | | |
|---|---|---|
| CN | 102265695 A | 11/2011 |
| CN | 102474386 A | 5/2012 |
| CN | 102571261 A | 7/2012 |
| CN | 102611536 A | 7/2012 |
| CN | 102624481 A | 8/2012 |
| CN | 102624501 A | 8/2012 |
| CN | 105794167 A | 7/2016 |
| EP | 1845742 A1 | 10/2007 |
| JP | 2015-513834 A | 5/2015 |
| JP | 2016-506202 A | 2/2016 |
| WO | 2011/104717 A1 | 9/2011 |
| WO | 2012/075387 A1 | 6/2012 |
| WO | 2012/115465 A2 | 8/2012 |
| WO | 2013/123961 A1 | 8/2013 |
| WO | 2014/109915 A1 | 7/2014 |

OTHER PUBLICATIONS

3rd Generation Partnership Project (3GPP), TS 36.211 V10.1.0, "Technical Specification Group Radio Access Network, Evolved Universal Terrestrial Radio Access (E-UTRA), Physical Channels and Modulation (Release 10)", Mar. 2011, pp. 1-103.

3rd Generation Partnership Project (3GPP), TS 36.212 V10.1.0, "Technical Specification Group Radio Access Network, Evolved Universal Terrestrial Radio Access (E-UTRA), Multiplexing and Channel Coding (Release 10)", Mar. 2011, pp. 1-76.

3rd Generation Partnership Project (3GPP), TS 36.213 V10.1.0, "Technical Specification Group Radio Access Network, Evolved Universal Terrestrial Radio Access (E-UTRA), Physical Layer Procedures (Release 10)", Mar. 2011, pp. 1-115.

* cited by examiner

SYSTEM AND METHOD FOR ADAPTIVE MODULATION

This application is a continuation application of U.S. patent application Ser. No. 15/950,388, filed Apr. 11, 2018, which is a continuation application of U.S. patent application Ser. No. 14/760,373, filed Jul. 10, 2015, now Issued U.S. Pat. No. 9,973,297, which is the national stage entry under 35 U.S.C. § 371 of Patent Cooperation Treaty Application PCT/US2014/011180, filed Jan. 11, 2014, which claims the benefit of U.S. Provisional Patent Application No. 61/821,189, filed May 8, 2013, U.S. Provisional Patent Application No. 61/857,397, filed Jul. 23, 2013, U.S. Provisional Patent Application No. 61/751,557, filed Jan. 11, 2013, the disclosures of which are hereby incorporated by reference in their entireties.

BACKGROUND

Current specifications, systems, and/or methods (e.g., LTE specifications, systems, and/or methods) may be targeted to support a wide range of deployments in terms of cell sizes, environments, and/or device speeds. As such, the physical layer may not be designed to take advantage of specific channel characteristics of the small cell environment thereby resulting in several limitations focusing on the downlink. For example, the current system may not support modulations of higher order than 64-QAM in the downlink. As such, the spectrum efficiency of a device located close to a small cell base station may be limited compared to what may be possible based on its signal-to-noise-plus-interference ratio. Additionally, the potential system throughput gains of small cells may not be attainable if resources may be consumed by overhead where such overhead may include resources used up by control signaling such as PDCCH or E-PDCCH, resources used up by physical signals not carrying information such as DM-RS, resource wasted when the minimum resource allocation unit for a UE may be larger than what may be needed, and the like. This may be a problem even if the bandwidth available to the small cell layer may be relatively large, because in a small cell cluster high signal-to-interference ratios may involve some form of frequency reuse (e.g., either through ICIC or some static mechanism) that may reduce the bandwidth available to each cell.

SUMMARY

Systems, methods, and/or techniques for providing a higher order modulation (HOM) and/or improving spectral efficiency may be disclosed. For example, a HOM transmission may be provided to a device such as user equipment (UE) or a wireless transmit receive unit (WTRU). According to an example embodiment, the higher order modulation transmission may be configured to be indicated by the network or the device. Additionally, multiple modulation and coding scheme (MCS) tables, transport block size (TBS) tables, and/or channel quality index (CQI) tables may be provided to support the HOM transmission. Such MCS and/or TBS tables may be scaled. In an embodiment, a CQI table configured to support the higher order modulation may be determined based on which MCS table may support the higher order modulation. Additionally, a CQI feedback configuration may be provided and/or used in such higher order modulation. Furthermore, data from a transport channel into a physical downlink control channel may be mapped; reception of a PDSCH over a set of frequency allocation or parameters may be attempted; downlink control information on the PDSCH may be mapped; the downlink control information may be multiplexed with the transport data on the PDSCH; the PDSCH may be received over a particular time slot or a subset of sub-carriers of a resource block pair; and the like. Additionally, in an embodiment, SA-PDSCH may be provided and/or used, for example, in combination with cross- or multi-subframe allocation. According to embodiments, one or more configurations for the higher order modulation may further be provided. Such configurations may include a ratio of PDSCH EPRE to cell-specific RS EPRE, reuse of quasi co-location indicator bits, rank restrictions for higher order modulation. RE mapping of PDSCH may also be provided and/or used for the higher order modulation.

For example, a first modulation coding scheme (MCS) table and a second MCS table may be provided at or by a network. The first MCS table may include an element table such as a 32-element table of MCSs or coding schemes for QPSK, 16QAM, and 64QAM. The second MCS table may include an element table such as a 32-element table of a MCS or coding scheme for at least 256QAM. In an example, the combination of the first and second MCS tables may enable support for the HOM transmission and the modulation orders or MCS coding that may be provided thereby. A downlink assignment may be provided and sent from the network to the device. The downlink assignment may include an indication of whether the device should use the first MCS table or the second MCS table for the HOM transmissions and/or MCS selection, modulation order selection or use, and/or the like for the HOM transmissions.

Additionally, in an example, a first channel quality indicator (CQI) table and a second CQI table may be provided at or by a device such as a UE or WTRU. The first CQI table may include an element table such as a 16-element table of CQIs (e.g., feedback or measurements or CQI values) QPSK, 16QAM, and 64QAM. The second CQI table may include an element table such as a 16-element table of a CQI (e.g., feedback or measurements or CQI values) for 256QAM. In an example, the combination of the first and second CQI tables may enable support for the HOM transmission and CSI or CQI reporting or measurements that may be provided thereby. A channel state information (CSI) report may be sent that may include an indication of whether the first CQI table or the second CQI table should be used for feedback reporting or measurements of HOM transmissions.

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to the limitations that solve one or more disadvantages noted in any part of this disclosure.

BRIEF DESCRIPTION OF THE DRAWINGS

A more detailed understanding of the embodiments disclosed herein may be had from the following description, given by way of example in conjunction with the accompanying drawings.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Systems and/or methods for providing improved downlink spectrum efficiency may be disclosed and may include and/or use channel coding, multiplexing, CSI feedback, and the like. For example, in such systems and/or methods, a UE may use multiple MCS and CQI tables to support higher modulation and/or may determine a CQI table to use based on which MCS table may be used or may be indicated by the network in DCI or higher layer signaling. Additionally, in such systems and/or methods, data from a transport channel may be mapped into a physical downlink control channel such as PDCCH or E-PDCCH. In such systems and/or methods, a UE may also provide reception of PDSCH over more than one set of frequency allocations and parameters where the sets may be indicated in downlink control signaling received a sub-frame (e.g., a previous sub-frame). Furthermore, in such systems and/or methods, downlink control information may be multiplexed with transport channel data on PDSCH, PDSCH may be received over a single time slot and/or over a subset of sub-carriers of a resource block pair, DL-SCH HARQ round-trip time may be decreased when PDSCH may be received over a single time slot, and the like. Additionally, in an embodiment, SA-PDSCH may be provided and/or used, for example, in combination with cross- or multi-subframe allocation. Furthermore, systems and/or methods may be provided to scale, for example, via a function or translation table, MSC and/or TBS stables to enable a higher order modulation (HOM) transport block sizes. Periodic and Aperiodic feedback configuration for different CQI Tables may further be provided. Additionally, in embodiments, one or more configurations for HOM including PDSCH-to-RS EPRE, PQI bit reinterpretation, rank restrictions (e.g., to reuse the antenna port(s), scrambling identity and number of layers indication), and/or the like may be provided and/or used. A RE mapping (e.g., a new RE mapping) of PDSCH and codeblock lengths for HOM to fairly spread out one or more codeblocks may also be used and/or provided. In an example, RE mapping may be provided in a frequency or frequency domain such that a code block may spread over an allocation such as the whole allocation as described herein.

Figure 1A:
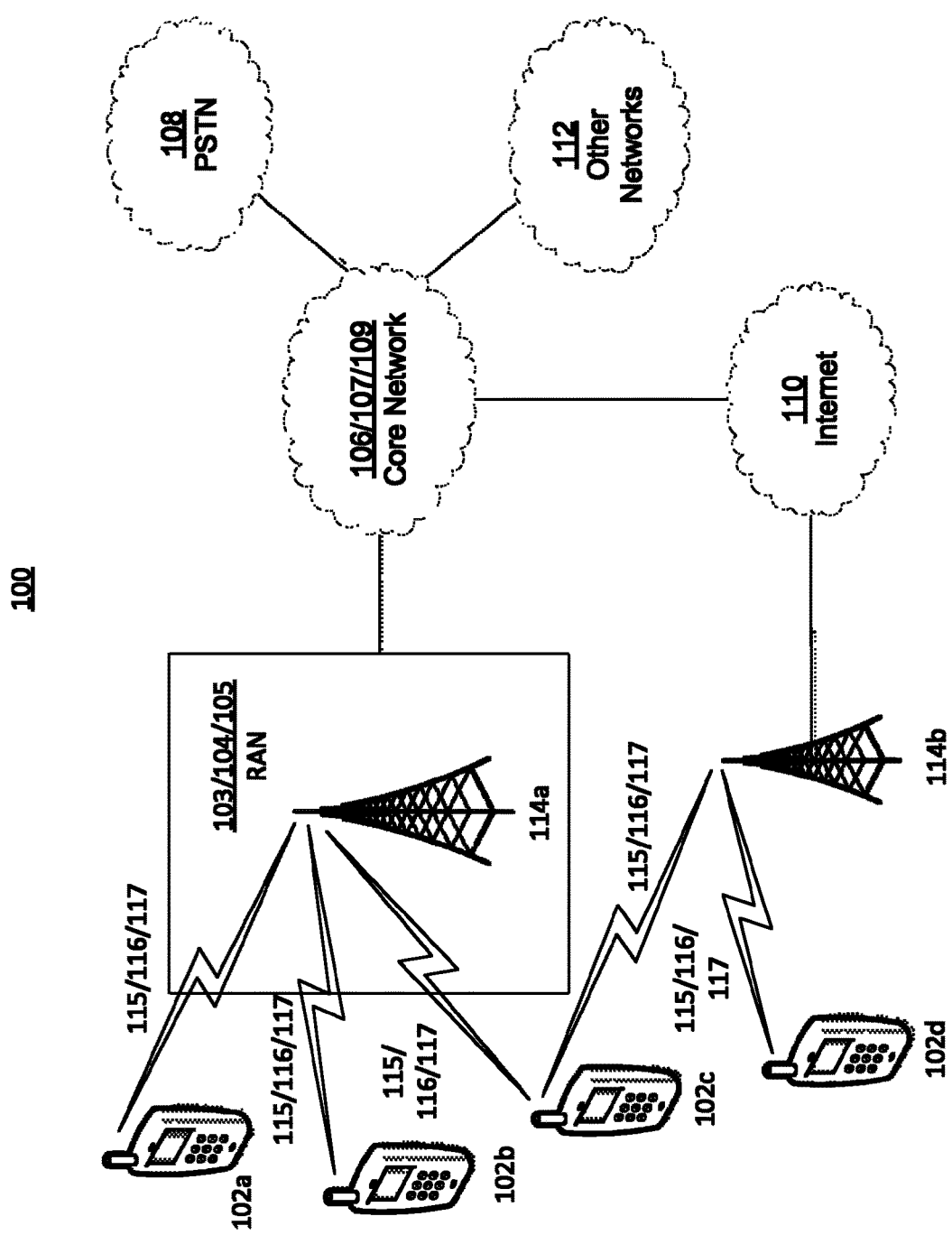
FIG. 1A depicts a diagram of an example communications system in which one or more disclosed embodiments may be implemented.

FIG. 1A depicts a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, and/or 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, and/or 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, and/or 102d in the communications system 100 may include multi-mode capabilities, i.e., the WTRUs 102a, 102b, 102c, and/or 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
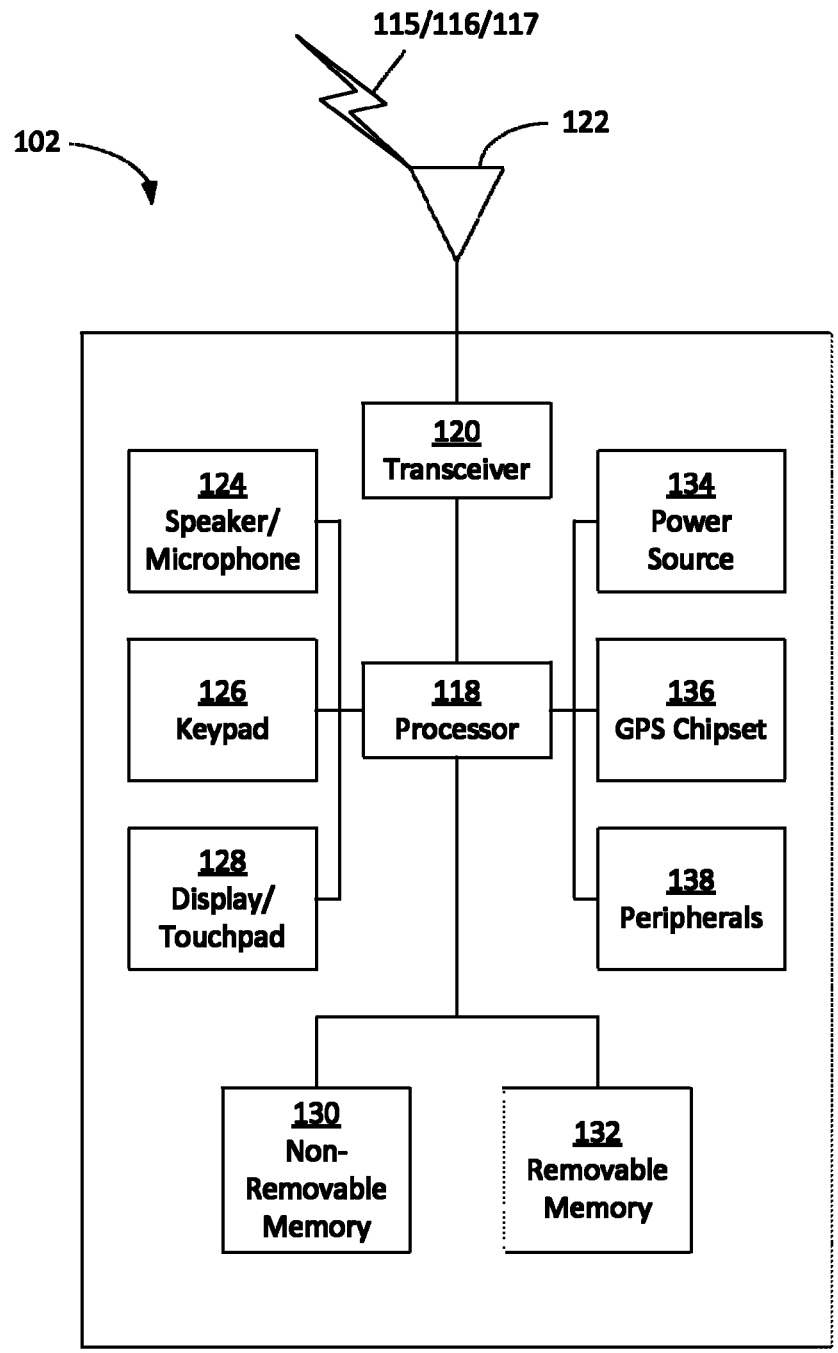
FIG. 1B depicts a system diagram of an example wireless transmit/receive unit (WTRU) that may be used within the communications system illustrated in FIG. 1A.

FIG. 1B depicts a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/

117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
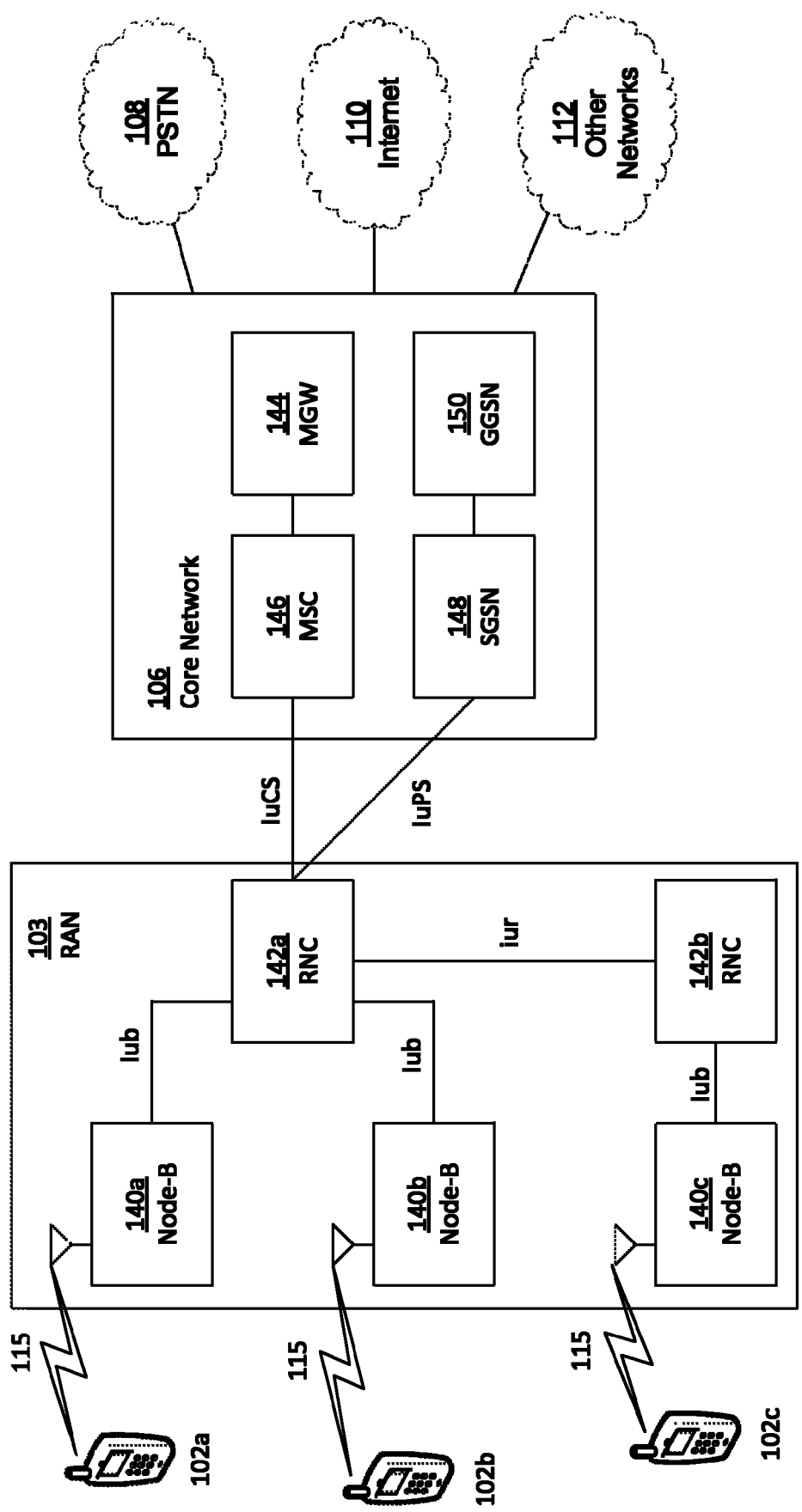
FIG. 1C depicts a system diagram of an example radio access network and an example core network that may be used within the communications system illustrated in FIG. 1A.

FIG. 1C depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 1C, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 1C, the Node-Bs 140a and/or 140b may be in communication with the RNC 142a. Additionally, the Node-B 140c may be in communication with the RNC 142b. The Node-Bs 140a, 140b, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 1D:
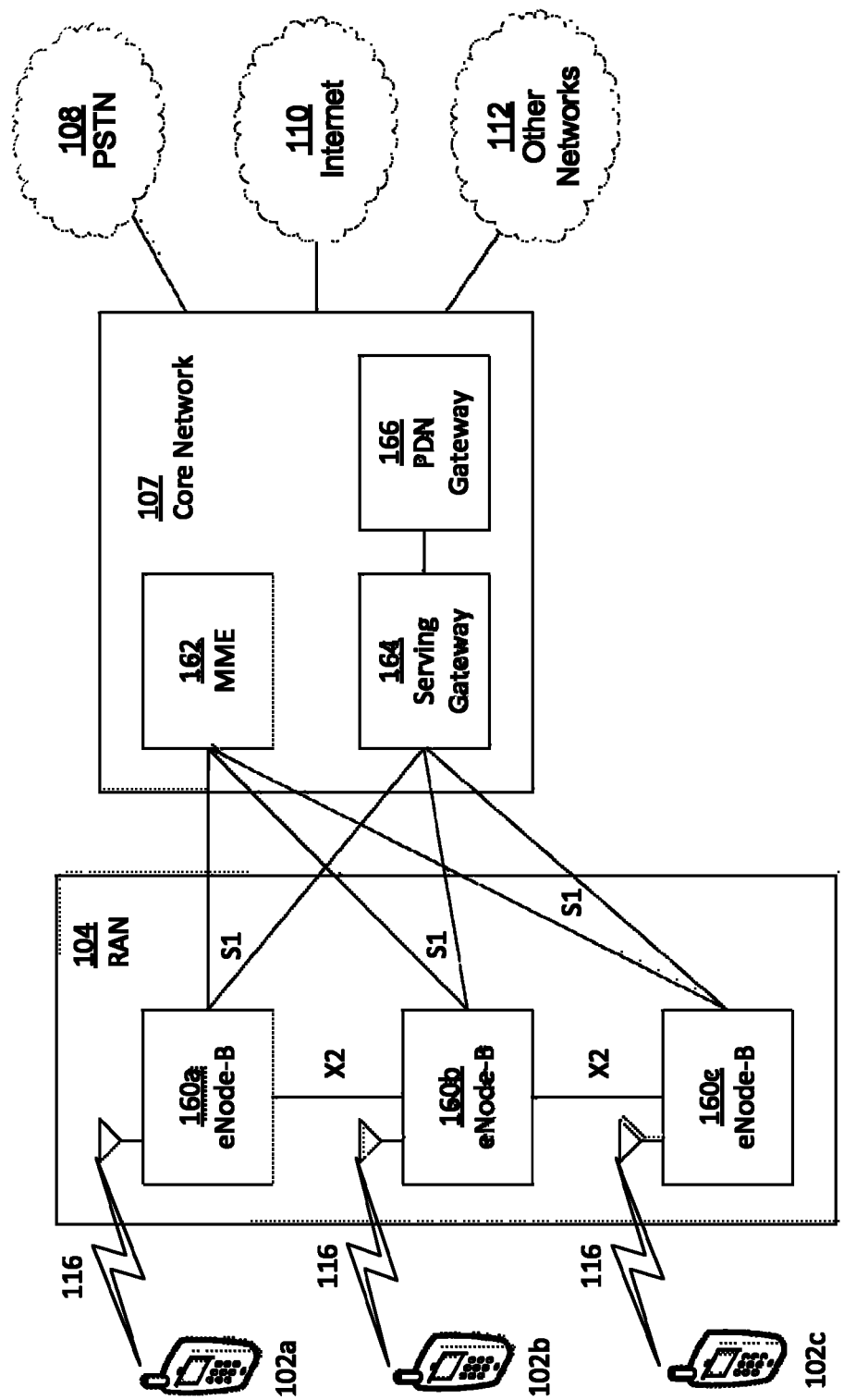
FIG. 1D depicts a system diagram of another example radio access network and an example core network that may be used within the communications system illustrated in FIG. 1A.

FIG. 1D depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a, 160b, and/or 160c may each include one or more transceivers for communicating with the WTRUs 102a, 102b, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, and/or 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an S1 interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 1E:
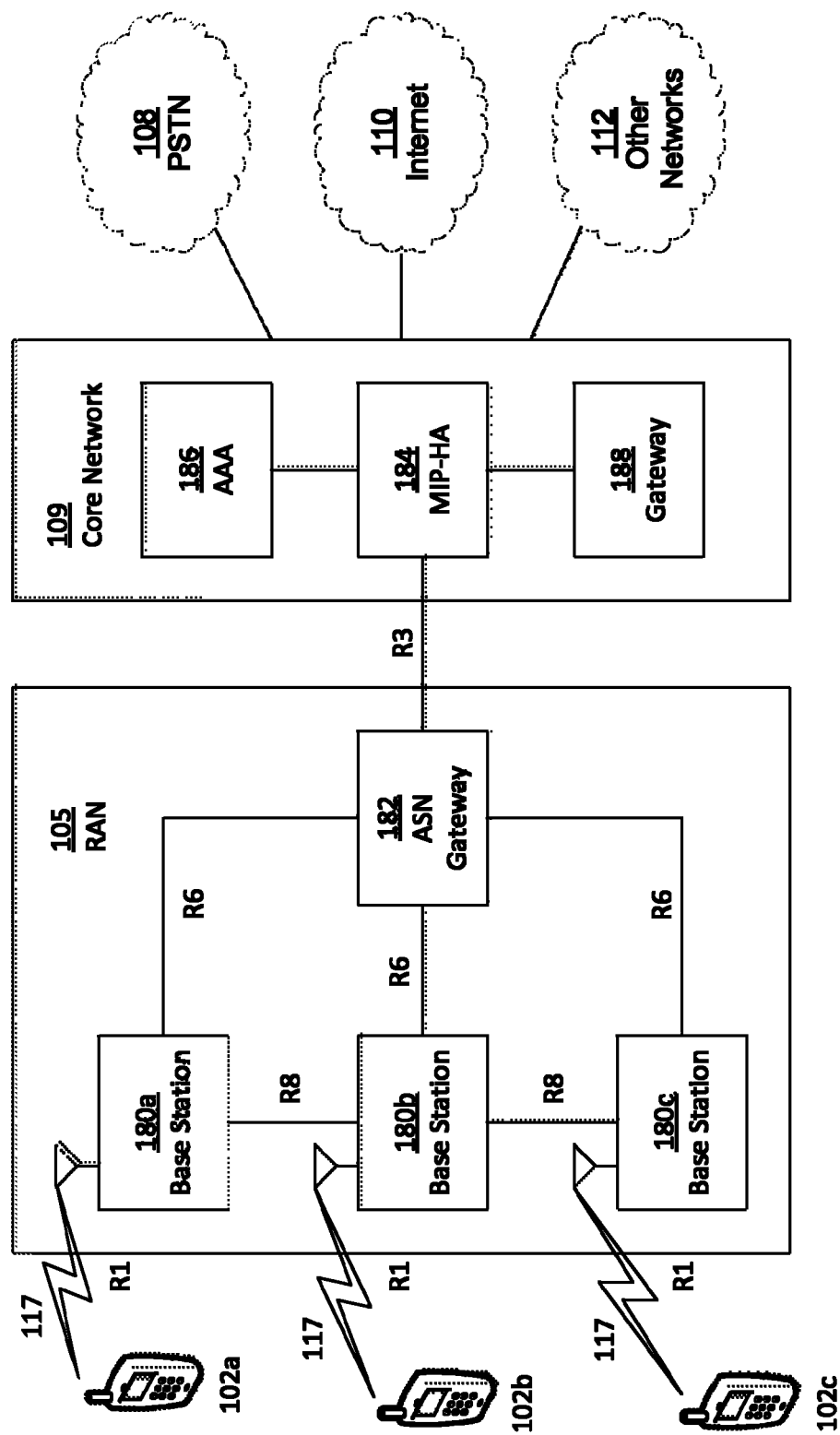
FIG. 1E depicts a system diagram of another example radio access network and an example core network that may be used within the communications system illustrated in FIG. 1A.

FIG. 1E depicts a system diagram of the RAN 105 and the core network 109 according to an embodiment. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 1E, the RAN 105 may include base stations 180a, 180b, and/or 180c, and an ASN gateway 182, though it will be appreciated that the RAN 105 may include any number of base stations and ASN gateways while remaining consistent with an embodiment. The base stations 180a, 180b, and/or 180c may each be associated with a particular cell (not shown) in the RAN 105 and may each include one or more transceivers for communicating with the WTRUs 102a, 102b, and/or 102c over the air interface 117. In one embodiment, the base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a, 102b, and/or 102c with access to circuit-switched networks, such as the PSTN 108, to facilitate communications between the WTRUs 102a, 102b, and/or 102c and traditional land-line communications devices. In addition, the gateway 188 may provide the WTRUs 102a, 102b, and/or 102c with access to the networks 112, which may include other wired or wireless networks that are owned and/or operated by other service providers.

Although not shown in FIG. 1E, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and/or 102c between the RAN 105 and the other ASNs. The communication link between the core network 109 and the other core networks may be defined as an RS reference, which may include protocols for facilitating interworking between home core networks and visited core networks.

In an embodiment, the deployment of a layer of small cells may be used to handle, for example, increasing capacity requirements that may be driven by the popularity of data-hungry devices such as smart phones. The layer of small cells may operate in a separate frequency band than cells that may be used by macro cell layer and/or may operate in the same frequency band. Using such examples, additional capacity may be expected to be provided via, for example, additional spectrum resources and/or by cell reuse as well as from spectrum efficiency gains that may be yielded by the channel characteristics of the small cell environment. For example, a distribution of path loss between the small cell and a connected device may be provided such that large values of signal-to-noise-ratio may be encountered more frequently. This may be exploited, in an example, by introducing support for higher-order modulations.

Figure 2:
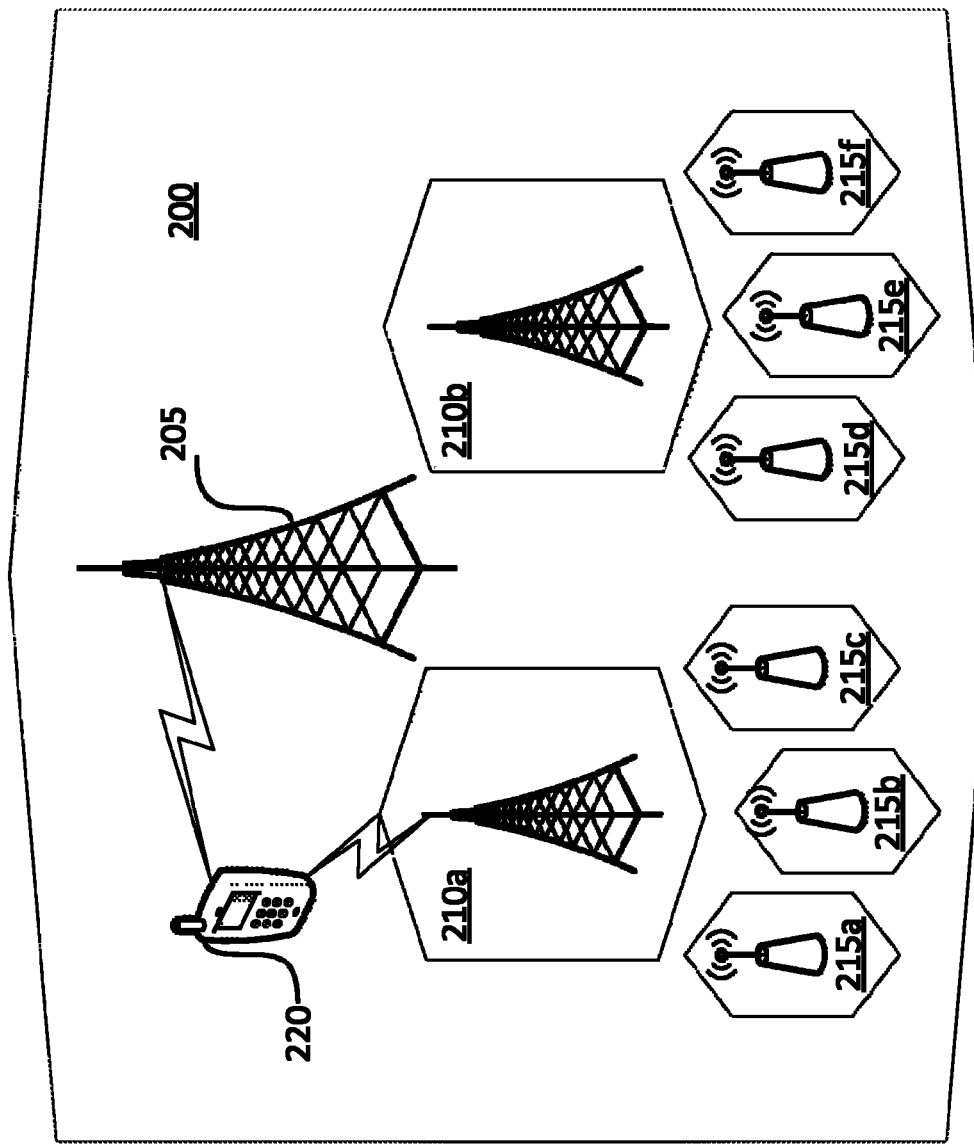
FIG. 2 depicts a diagram of an example communication system with cells that may have different sizes.

FIG. 2 illustrates an example embodiment of a network with smaller and larger cells that may be used herein. The network (e.g., network 200) may include, for example, one or more layers of larger cells (e.g., macro cells) such as a cell 205 and/or one or more layers of smaller cells (e.g., pico cells, femto cells, and the like) such as cells 210a and 210b and/or cells 215a-c that may be used to provide communication to a device (e.g., 220) that may be a UE and/or WTRU 102a-d described with respect to FIGS. 1A-1E. According to an embodiment, the coverage area of the smaller cells may be less than that of the larger cells. Additionally, the larger cells and smaller cells may or may not be operating on the same frequency layer. The cells (e.g., 205, 210a-c, and/or 215a-f) of the network (e.g., 200) may be part of one or more components of a communication network such as the communication network 100 described herein including a radio access network, base station, and/or the like and may be in communication with a core network.

In examples (e.g., in Rel-11), orders of modulation that may be allowed or used in the networks described herein (e.g., 100 and/or 200) may include QPSK, 16QAM and 64QAM. To use such orders, the network such as the network 100 and/or 200 and components thereof described herein with respect to FIGS. 1A and 1C-1E and FIG. 2 may indicate to a device such as UE or WTRU including the WTRUs 102a-d described with respect to FIGS. 1A-1E a modulation and coding scheme (MCS). In an example, the MSC may be indicated using 5 bits in a downlink assignment. The five bits may map to a modulation order and transport block size (e.g., when tied to a resource block allocation that may also be signaled in the downlink assignment). In an embodiment, the mapping may be determined from a pre-configured set of tables. For example, a MCS Table may be used to determine a modulation order and/or a transport block index where the index may be used in conjunction with the resource allocation size to determine the transport block size. A device may indicate to the network its preferred CQI using 4 bits in CSI feedback. The four bits may map to a modulation and code rate with a mapping that may be determined from a pre-configured table (e.g., a CQI Table).

As described herein, current specifications, systems, and/or methods (e.g., LTE specifications, systems, and/or methods) may be targeted to support a wide range of deployments in terms of cell sizes, environments, and/or device speeds. As such, the physical layer associated with such specifications, systems, and/or methods may not be designed to take advantage of specific channel characteristics of the small cell environment. This may result in one or more limitations on the downlink. For example, the current system may not support modulations of higher order than 64-QAM in the downlink. As such, the spectrum efficiency of a device located close to a small cell base station may be limited compared to what may be possible considering its signal-to-noise-plus-interference ratio. Additionally, the potential system throughput gains of small cells may not be attainable if resources may be consumed by overhead where such overhead may include resources that may be used up by control signaling such as PDCCH or E-PDCCH, resources that may be used up by physical signals not carrying information such as DM-RS, resource that may be wasted when the minimum resource allocation unit for a device may be larger than what may be needed, and the like. This may be a problem, for example, even if the bandwidth available to the small cell layer may be relatively large, because in a small cell cluster high signal-to-interference ratios may involve some form of frequency reuse (e.g., either through ICIC or some static mechanism) that may reduce the bandwidth available to each cell.

As such, systems and/or methods described herein may be provided to take advantage of channel characteristics of a small cell environment and, in particular, in the downlink, to support modulation of a higher order, for example, in the downlink, to improve throughput gains of small cells that may be otherwise reduced when resources may be consumed by overhead, and the like. For example, a higher-order modulation may be provided, received, and/or used. In an embodiment, a device such as a UE or WTRU such as WTRUs 102a-d described with respect to FIGS. 1A-1E may operate close (e.g., very close or similar) to a small cell base station, or equivalently, the signal to noise ratio of a transmission from a small cell may be high (e.g., very high).

Additionally, in current systems and/or methods (e.g., in Rel-11), the highest spectral efficiency a device may recommend to a network may be 5.5547 bps/Hz (e.g., using 64QAM). However, it may be possible that such a device may be served at a higher spectral efficiency. As such, the throughput (e.g., a maximum throughput) may be increased. Such an increase in throughput may enable better scheduling flexibility at an eNB or base station such as the bases stations, NodeBs, or eNBs (e.g., 114*a-b*, 140*a-c*, 160*a-c*, and/or 180*a-c*) described with respect to FIGS. 1A and 1C-1E, possibly lower system interference, better user experience, and/or the like. Examples (e.g., systems and/or methods) for enabling use of higher order modulation transmission to a device may be described herein and may include providing an indication of a higher order modulation scheme to a device and/or enabling a device to indicate a desired higher order modulation.

In examples, multiple MCS tables may be provided and/or used to, for example, provide HOM in a device. For example, to accommodate higher order modulation, a network may use a set of MCS tables instead of a single MCS table. The network may use a 32-element table (e.g., a first table or first MCS table such as a Rel-11 32-element table) that may be valid for QPSK, 16QAM, and/or 64QAM (e.g., a first set of modulation orders or values). The network may use a new 32-element table (e.g., a second table or second MCS table) that may be valid for 256QAM (e.g., a second set of modulation orders or values). According to an example, the second table may keep some values reserved for future expansion. Alternatively or additionally, the second table may be fewer than 32 elements and may use fewer bits of signaling. The second table may have values for QPSK, 16QAM, 64QAM, and/or 256QAM (e.g., the second set of modulation orders or values may include the orders or values of the first set along with 256QAM). Each modulation order may have fewer coding schemes than current or typical tables (e.g., in the Rel-11 table) to ensure that 32 elements may still be enough to accommodate the new modulation orders. The second table may have more than 32 elements in an example. As such, in an example, a first MCS table and a second MCS table may be provided to enable MCS selection or coding selection in HOM transmissions (e.g., transmissions using modulation orders or values such as QPSK, 16QAM, 64QAM, and/or 256QAM described herein).

According to an example (e.g., when a device may be configured for possible reception of PDSCH that may span the modulation orders of multiple tables), the network may indicate in a downlink assignment, the MCS table configured to be used with the MCS index that may be provided. For example, the network may send a downlink assignment comprising an indication of whether the first or second MCS tables should be used by the device for HOM transmissions. In an embodiment, the indication may be sent when the device may be configured for reception of a physical data shared channel (PDSCH) that may span modulation orders of both the first MCS table and the second MCS table.

Such an indication may be explicit and may use at least one of the following. For example, such an indication may use a bit (e.g., a new bit) in the downlink assignment. Such a bit may indicate the table to be used or may be tied to a 5-bit string (e.g., the Rel-11 5-bit string) to create a 6-bit string. In an example, if there are more than two MCS tables, multiple bits (e.g., a bit string that may include new bits) may be provided and/or used. Additionally, such an indication may use higher layer signaling, for example, to semi-statically configure a device to use a specific table. According to additional examples, such an indication may include or use a new transmission mode (e.g., such as TM11). For example, a device operating in such a particular transmission mode such as a new transmission mode may be configured to operate with a specific MCS table. In such an example, TM11 may be used for high spectral efficiency and, thus, may be associated to be used with an MCS table that may enable or allow for higher spectral efficiency. Such an indication may also use a different scrambling code for the downlink assignment. For example, a device may have, provide, or use a C-RNTI for low order modulation and a different C-RNTI for high-order modulation.

The MCS table that may be configured to be used to map the MCS bit in the downlink assignment (e.g., to a value of modulation and coding) may be indicated implicitly by at least one of following. The MCS table may be indicated implicitly by the type of downlink assignment used. For example, each DCI Format may be associated with a specific MCS Table. In one method, a new DCI Format (e.g., DCI Format 5) may be used to schedule devices such as UEs or WTRUs while using a MCS table such as a new MCS table. Additionally, the MCS table may be indicated implicitly by the channel used for downlink assignment. For example, a network may use either PDCCH or E-PDCCH to transmit DCI. The MCS table used may be tied to the use of either PDCCH or E-PDCCH. The MCS table may be indicated implicitly by a parameter (e.g. the type or the physical resources used) of the E-PDCCH used to transmit the downlink assignment; the search space used (e.g., a device-specific or UE-specific search space DCI may be tied to one MCS table, such as a table suitable for HOM transmission, while common search space DCI may be tied to another, such as a legacy MCS table); the subframe in which the downlink assignment may be provided where, for example, there may be subframe subsets tied to each MCS table; the carrier indication in the downlink assignment where, for example, a device may be configured with multiple carriers, each of which may be configured to operate with a specific MCS table; and/or the like. The association of a legacy MCS table to a common search space may allow the network to revert (e.g., quickly) to a table allowing access to the most robust modulation and coding schemes in case the radio conditions suddenly deteriorate.

Scaling of MCS and/or TBS tables may be provided and/or used as described herein. In an example, the modulation and TBS index table may be reinterpreted by use of a scaling function. For example, when triggered (e.g., possibly by a higher layer configuration or by dynamic signaling within a DCI), the modulation order associated with each MCS index may be reinterpreted as $Q^*_m = Q_m + \Delta$ where $Q_m$ may represent the modulation order that may be obtained by the MCS index and the legacy table and $Q^*_m$ may represent the modulation order to be used. The value of $\Delta$ may be fixed for the MCS indices (e.g., $\Delta=2$ may be used for the MCS indices). Each MCS Index may have its own $\Delta$. In such an example, different values of $\Delta$ may enable the modulation and TBS index table to retain some legacy MCS levels.

Modulation and TBS index tables that may be used to enable higher order modulation (HOM) may scale the TBS Index ($I_{TBS}$). For example, when triggered for use with HOM, the TBS index to be used may be obtained from the MCS index as well as the legacy TBS index as $I^*_{TBS} = I_{TBS} + \alpha$. The value of $\alpha$ may be common to the MCS indices or may be different for each MCS index.

Additionally, in an example, a total number of allocated PRBs as obtained by the DCI grant or assignment may be set as $N'_{PRB}$. The column indicator that may be used to determine the transport block size (TBS) may be obtained from the following: $N_{PRB}=f(g(N'_{PRB}\times\gamma))$ where $\gamma$ may be a preconfigured constant and f and g may be functions. For example, f may be $f(x)=x$, $f(x)=\max(x, 1)$ or $f(x)=\min(x, \max(TBS))$ where max(TBS) may be preconfigured. In an example, g may be $g(x)=x$, a ceiling function or floor function. Additionally, an example scaling function may be $N_{PRB}=\max(\lceil N'_{PRB}\times 8/6\rceil, \max(TBS))$.

The $N_{PRB}=f(g(N'_{PRB}\times\gamma))$ function may be used for the MCS indices, for example, when a device may be configured to possibly use HOM. In another or additional example, the $N_{PRB}=f(g(N'_{PRB}\times\gamma))$ function may be used for MCS indices that specifically use certain modulation levels. The rest of the indices may use $N_{PRB}=N'_{PRB}$.

Additionally, in an example, the TBS may be first determined from the TBS index and the number of allocated PRBs. A UE may also be pre-configured with a TBS translation table to be used for HOM, for example, converting the TBS obtained from the TBS index and number of allocated PRBs to another TBS value.

According to additional embodiments, any combination of the above can be used to scale the MCS and TBS values. For example, for some values of number of allocated PRBs, a function may be used and for other values of allocated PRBs a translation table may be used.

Multiple CQI tables may also be provided and/or used. For example, to allow for or enable higher order modulation, a device may use a set of CQI tables. As an example table (e.g., a first table or first CQI table), the device may use a 16-element table (e.g., the current Rel-11 16-element table) that includes CQI values that may be valid for QPSK, 16QAM, and/or 64QAM (e.g., a first set of modulation orders or values). As an additional or another example table (e.g., a second table or second CQI table), a device may use a new 16-element table that includes CQI values that may be valid for 256QAM (e.g., a second set of modulation orders or values). In an embodiment, the second table may keep some values reserved for future expansion. Additionally, the second table may be fewer than 16 elements and may use fewer bits of signaling. In another or additional example, the second table may have values for QPSK, 16QAM, 64QAM, and/or 256QAM (e.g., the second set of modulation orders or values may include the orders or values of the first set along with 256QAM). Each modulation order may have fewer coding schemes than in a table such as a Rel-11 table, for example, to ensure that 16 elements may be enough to accommodate the new modulation orders. The second table may have more than 16-elements. As described herein, a first and second CQI table may be provided to enable CQIs (e.g., reporting, feedback, or measurements) in HOM transmissions (e.g., transmissions using modulation orders or values such as QPSK, 16QAM, 64QAM, and/or 256QAM described herein).

According to an example (e.g., when a device may be configured for possible reception of PDSCH that may span the modulation orders of multiple tables), a device may indicate in a CSI feedback report the CQI table to be used (e.g., whether the first or second CQI table should be used) with the CQI index provided. For example, a device may send a CSI report that may include an indication of whether the first CQI table or the second CQI table should be used, for example, for feedback reporting for HOM transmissions. In an embodiment, the indication may be sent when the device may be configured for reception of a physical data shared channel (PDSCH) that may span modulation orders of multiple tables such as the first CQI table and the second CQI table. Such a configuration may be implicitly determined at a device, for example, when may is also configured to determine the MCS of PDSCH data via the use of enhanced and/or multiple MCS tables.

Such an indication may be explicit and may use at least one of the following. For example, a bit and/or bit-string such as a new bit or bit string may be used in CQI feedback report types to indicate the table used for CSI. The bit and/or bit string may indicate the table. In another or additional example, the CSI report type may be expanded (e.g., beyond the current 4 bits) such that the report type may provide an index for a table with more than 16 elements. A feedback report type, for example, a CQI Type Indicator (CTI) may be provided and/or used for such an indication. In such an embodiment, the CQI table that may be used may depend on a recently transmitted CTI (e.g., the most recently transmitted CTI). Additionally, the indication may be provided once (e.g., in wideband CQI) and may be used for each subsequent subband CQI report.

According to an embodiment, the network may configure a device to use a specific CQI table in its feedback reports. For example, a device may be configured (e.g., via a configuration in a feedback report received from the network) to use either the first CQI table or the second CQI table for feedback reporting such as CSI measurements and/or reporting (e.g., CQI reports or measurements) for HOM transmissions. Such configuration may use at least one of the following. For example, higher layer signaling may be used to configure the device to semi-statically use a specific table. In an example each feedback report type may be associated with a specific assumption on the CQI table to use. In an example, the configuration of a CSI Process may include the use of a specific CQI table for feedback reporting. As such, a device may be configured with multiple CSI processes each of which possibly using a different CQI table. Additionally, a transmission mode such as a new transmission mode (e.g., TM11) may be used. Devices operating in such a transmission mode may be configured to operate with a specific MCS table. For example, TM11 may be used for high spectral efficiency and, thus, may be associated with the use of an MCS table that may allow or enable higher spectral efficiency. In an embodiment, a downlink assignment may include a bit string indicating to the device that in future feedback reports a specific CQI table may or should be used.

Additionally, in an embodiment, the CQI table that may be used to map the CQI bit in the feedback report to a value of modulation and coding may also be indicated implicitly by at least one of the following. The CQI table maybe indicated (e.g., implicitly) by the subframe in which the CQI may be reported and/or measured. For example, a device may be configured with multiple subframe subsets, each tied to the use of a specific CQI table. The CQI table may be indicated also by the type of feedback. For example, aperiodic feedback may use a specific CQI table while periodic feedback may use another. Periodic feedback may use a particular CQI table (e.g., Rel-11 table) while aperiodic feedback may use various tables and may, thus, provide or include a proper explicit indication to indicate the CQI table that may be used. The CQI table may further be indicated using the carrier for which the feedback report may be used, destined, and/or provided. For example, a device may be configured with multiple carriers each of which may be configured to operate with a different CQI table.

A CQI feedback configuration may also be provided and/or used as described herein. For example, to indicate the CQI Table that may or should be used in aperiodic reporting, each CSI process (and/or serving cell) that may be included in one or more of the sets of CSI processes represented by each codepoint of the CSI request may be configured with a specific CQI table assumption. Additionally, the CSI processes and/or serving cell may themselves be configured with CQI table assumptions. In an example (e.g., when a UE may be configured with the meaning of each CSI request field), the sets of CSI processes (e.g., and/or serving cells) may be configured with a CQI table index. For example, a first CSI process may be in a set triggered by CSI request field '01' as well as in a set triggered by CSI request field '10.' Further, in an embodiment, the CQI table to be used maybe different and may be configured upon configuration of the contents of CSI request field '01' and '10.' In an example, the CQI table that may or should be used for an aperiodic CSI report may be tied to a search space in which the PDCCH or E-PDCCH including the grant with the aperiodic CSI request may be decoded. For example, the CQI table may correspond to a first CQI table (e.g., a legacy table) in case the grant may be decoded in a common search space, and to a second CQI table (e.g., a table suitable for HOM transmission) in case the grant is decoded in a device-specific or UE-specific search space. In another or additional example, the CQI table may be tied to the size of the CSI request field. For example, the CQI table may correspond to a first CQI table in case the CSI request field may have 1 bit, and to a second CQI table in case the CSI request field may have 2 bits. The relationship between a particular search space, or CSI request field value, or CSI request field size, and a specific CQI table to use for the reporting, may be configured by higher layers. For example, the device such as a UE or WTRU may associate the use of a CQI table (e.g., suitable for HOM transmission) to a CSI request field value or size in case it may be configured to use higher-order modulation.

In an example, upon configuration of aperiodic and/or periodic feedback modes, the appropriate CQI table may also be configured. Additionally, aperiodic and/or periodic feedback modes may be designated for the use of CQI tables that may enable the use of higher order modulation (HOM). In such an embodiment, a device being configured with such a feedback mode may implicitly indicate to the device what CQI table to use.

In another or additional example, some aperiodic feedback modes may use a device to feedback a CQI value based on the assumption that HOM may available as well as another CQI value assuming that HOM may not be available. In such an embodiment, the RI and the PMI may also depend on whether HOM may be available, and the device may feedback two complete sets of RI/CQI/PMI for each HOM assumption.

A relationship between CQI and MCS tables may also be provided as described herein. For example, if a device may have multiple CQI tables (e.g., the first or second CQI tables) and may autonomously select the table from which to feed back a CQI value, the network may not be able to schedule the device for MCS values from outside of the device-selected (e.g., the UE-selected or WTRU-selected) table. In such an embodiment, explicit signaling by the network towards the device may be provided and/or may allow for transmission with MCS values (e.g., values in the first or second MCS tables) that may not be represented in the CQI table used by the device.

The MCS and CQI tables may be configured simultaneously and may be related. In such an embodiment, use of a specific or particular CQI table (e.g., the first or second CQI table) by the device may inform the network that it should or may use the related MCS table in downlink assignments. Additionally, use of a specific MCS table by the network may inform the device to use the related CQI table in its future feedback reports. Such a use may be indicated in a previously received DCI or by higher layer signaling.

Additionally, in an example, multiple CQI tables may have overlapping modulation and coding scheme values and/or multiple MCS tables may also have overlapping values. In a downlink assignment, use of a value by the network that may overlap multiple MCS tables (e.g., the first and second MCS tables) may inform the device that for future feedback reports it should or may switch CQI tables to another that may have the same modulation and coding scheme value (e.g., should select one of the first or second CQI tables based on the indication of MCS table such as the first or second MCS tables being used). The reverse may also be applicable (e.g., where a device feeding back a value that may be overlapping two CQI tables may inform the network to switch tables in a future downlink assignment grant). As such, in an example, a downlink assignment that may be received from the network may include an indication of a particular MCS table to be used (e.g., the first or second MCS table). Based on that indication, for example, based on the MCS table identified by the indication, the device may determine which CQI tables to use (e.g., whether to use the first or second CQI tables).

An example of such examples may include a first CQI table that may have values (0, 1, 2, 3, 4, 5), a second CQI table that may have values (4, 5, 6, 7, 8, 9), a first MCS table that may have values (a, b, c, d, e, f), and/or a second MCS table that may have values (e, f, g, h, i, j). In such an embodiment, a device may be configured with such tables and informed and/or told of the linking of MCS table 1 to CQI table 1 and MCS table 2 to CQI table 2. A device may be configured to use CQI table 1 (e.g., first) and it may receive a downlink assignment (e.g., using MCS table 1) for value e (e.g., or any other suitable element that may be located in both MCS tables). Due to the fact that such an MCS value may be located in both MCS tables, the device may know that in its future feedback reports it should or may use CQI table 2 and its future downlink assignment may use MCS table 2. A switch may also be originated from the device's feedback. According to an example embodiment, to help ensure there may be no error propagation, the table selection may be reset at pre-configured intervals. For example, at a particular subframe interval (e.g., every n subframes), the CQI and MSC tables may be reset to table 1.

An indication method (e.g., for either the CQI or MCS table) may be used by the other node or another node as an indication that it should or may use the appropriate related table. For example, a downlink assignment may include an indication to use MCS table 2 for future device feedbacks and, as such, the device may or should use CQI table 2. The CQI table indication may also be transmitted in the UE feedback and may be used by the network to select the appropriate MCS table.

Additionally, in an example, one or more pre-configured MCS values in downlink assignments (e.g., such as 29, 30 or 31) may be used to indicate to a device that for this grant the MCS to be used may be the same as the last MCS used and for future feedback reports, the device should or may switch tables and for future downlink assignment, and/or the MCS table used should or may be switched.

MCS and/or CQI table sizes may also be increased. For example, to accommodate higher order transmission, one or both of the MCS and CQI tables may be increased in size (e.g., to include each possible modulation and coding scheme). Signaling may also be modified to use additional or more bits for proper indexing.

In an example, a device may be configured with a CQI restriction list. This restriction list may be higher-layer signaled and/or may be specified by a bitmap parameter CQISubsetRestriction. For a specific CQI table and transmission mode, the bitmap may specify the possible CQI subsets from which a device may assume or know that the eNB may be using, for example, when the device may be configured in the relevant transmission mode. In one embodiment, each bitmap may be preconfigured to indicate different subsets. In another or additional embodiment, the bitmap may form a bit sequence where a bit value of zero may indicate that the CSI reporting may not be allowed to correspond to a CQI associated with the bit. The association of bits to CQI values for the relevant transmission modes may be preconfigured. In such an embodiment, a smaller CQI subset may use fewer bits for CQI feedback.

CQI subset restriction may also indicate the MCS subset restriction that may be used in downlink assignment. Additionally, in an embodiment, a device may be configured with an independent MCS subset restriction. The restriction list may be higher-layer signaled and may be specified by a bitmap parameter MCSSubsetRestriction. Similar rules as those written for CQISubsetRestriction may also apply in examples.

For CQI feedback of a table with more than 32-elements, a device may feedback the CQI index in two parts. One part may be fed back less frequently than the other part in an embodiment. For example, one set of bits may represent the modulation while another set of bits may represent the coding scheme. For a flat channel, the modulation may not need to change very often. As such, a device may feedback the set of bits representing the modulation less often than the set of bits representing the coding scheme (e.g., where the coding scheme may be dependent on the most recently fed back modulation level). The MCS table may be segregated and indicated similarly. In a downlink assignment that includes the set of bits for the coding scheme, it may be recognized that the most recently assigned modulation level may be used and/or it may be dependent thereon. Additionally, the first set of bits fed back by the device (e.g., the modulation level) may also be used by the network and may not need to be signaled by the network for MCS assignment.

One or more configurations for Higher Order Modulation (HOM) may be provided and/or used. For example, a ratio of PDSCH EPRE to cell-specific RS EPRE may be provided and/or used (e.g., as a configuration). In an embodiment, for a device in a transmission mode where 256 QAM and/or any other higher order modulation HOM may be applicable and where device-specific or UE-specific RSs may not be present in PRBs when the corresponding PDSCH may be transmitted, the device may assume that for 256 QAM, the ratio of PDSCH EPRE to cell-specific RS EPRE, denoted by either $\rho_A$ or $\rho_B$, may be equal to an offset value of the ratio used for 16QAM and/or 64 QAM. The offset between the ratio that may be used for 256 QAM and the ratio that may be used for 16 QAM/64 QAM may be configured via higher layers and/or may be included in the DCI that may include the PDSCH assignment. In another or additional embodiment, the $P_A$ parameter that may be provided by higher layers and that may be used in the formulation of $\rho_A$ may be dependent on the modulation order. For example, a device may be configured with multiple $P_A$ parameters, via higher layer signaling, with an understanding, an indication, or knowledge of what modulation order each may be for. Additionally, a device may be configured with multiple ratios of PDSCH EPRE to cell-specific RS EPRE and each of these ratios may be conditioned on the MCS level that may be used in a downlink transmission.

According to an example, quasi co-location indicator bits may be provided and/or used (e.g., as a configuration). For example, a device may be configured with different assumptions on the quasi co-location of antenna ports. This may enable the device to be able to receive data from multiple points that may not be physically co-located. For HOM, it may be unlikely that downlink data may be transmitted from rapidly varying physical locations. As such, in an embodiment, the PQI bits that may indicate the QCL behavior in transmission mode 10 may be reused when a device may be configured with HOM. For example, a device configured with the ability to use HOM may reinterpret one or more of the bits of the PQI located in the downlink assignment DCI, for example, as an indication that a certain transmission may be for HOM. According to one embodiment, an indication that a transmission may be for HOM may configure a device to use a second set of MCS and CQI tables. In another or additional embodiment, a device may reinterpret one or more of the bits of the PQI to indicate to what MCS table (e.g., or similarly, to what shifted value of the MCS table) a device should or may associate the MCS bits located in the same DCI assignment.

Additionally, one or more rank restrictions for HOM may be provided and/or used (e.g., as a configuration). In an example, there may be one or more configurations where a device may have pre-configured limitations on the possible number of transmission layers for HOM. For example, a device may be configured via higher layers to report rank up to a certain value (e.g., when the device may report CQI levels that use HOM). Furthermore, a device may be expected to have transmission rank of up to a pre-configured value when its downlink assignment may indicate the use of HOM. In such an embodiment, the device may be configured to reinterpret the antenna port(s), scrambling identity and/or number of layers indication provided in the DCI for downlink assignment. One or more bits (or equivalently, one or more values) of this indication may indicate to the device the appropriate table to interpret the meaning of the MCS bits located within the same assignment. For example, one or more values of the antenna port(s), scrambling identity and number of layers indication may inform the device that the MCS bits indicated in the same assignment correspond to a first or a second MCS table (and/or a shifted version of the MCS table).

In another or additional embodiment, a device configured with HOM may be configured with one transport block. In such an embodiment, if a device may receive as MCS for a second transport block one of the reserved MCS indices (e.g., 29, 30 or 31), it may reinterpret that to mean that the first transport block assumes a second MCS table and/or a shifted version of the MCS table that may enable HOM.

Resource Element (RE) mapping of PDSCH for HOM may be provided and/or used (e.g., as a configuration). For example, a mapping such as a legacy mapping of transport blocks to a resource grid may be provided or performed (e.g., done) by mapping along subcarriers (e.g., in order of increasing index) in the assigned physical resource blocks and then moving on to the next OFDM symbol and continuing with the same process. Since, in an example, codeblocks may be limited to 6144 bits, the use of HOM with large physical resource block allocations may lead to some codewords being completely included within one OFDM symbol. Additionally, different OFDM symbols may be affected differently by interference since some neighboring cells' reference symbols (e.g., possibly using high power) may not located in each of the OFDM symbols. In an embodiment, codeblocks included entirely within one OFDM symbol may lead to large disparity of the error performance of different codeblocks. Furthermore, an overall error performance of the transport block may be dominated by the worst codeblock performance. In an example, to alleviate this, HOM may use codeblocks larger than 6144 bits.

According to examples, a device may be configured such that when HOM may be used, a maximum codeblock length may be greater than 6144. For example, for HOM, a total number of codeblocks (e.g., defined as the transport block size divided by the maximum number of bits in a codeblock) may be decreased. A maximum codeblock size may also depend on an MCS used. The difference between such examples may be that in the former, for example, when a device may be configured to use HOM, it may use a new or particular maximum codeblock length. In the latter, when a device may have an assignment with an MCS using HOM, it may use a new maximum or particular codeblock length.

Additionally, a device may be configured to handle interleavers such as larger interleavers for encoding such as turbo encoding. In such an example, a table of allowed interleaver sizes may be extended. For example, in an embodiment, a device may be configured with multiple sets (e.g., two sets) of tables that may indicate allowed interleaver sizes. Each of the tables that may be used may include different MCS values. Additionally, a device may use codeblocks that may be greater than 6144. Each codeblock may be segmented such that current interleaver sizes may remain applicable. In an example, one or more segments of the codeblock may be concatenated and interleaved to ensure similar error performance over the segments.

A mapping of transport blocks to a resource grid may be modified to ensure that no codeblock may be fully included within a single OFDM symbol. For example, a mapping may be done over OFDM symbols (e.g., in order of increasing index) within a single subcarrier and then may be moved on to a next subcarrier.

Additionally, a mapping may be done over pairs of OFDM symbols. For example, a first symbol of the transport block may be mapped to a first subcarrier and a first OFDM symbol, a second symbol of the transport block may be mapped to the first subcarrier and to a second OFDM symbol, a third symbol of the transport block may be mapped to a second subcarrier and to the first OFDM symbol, a fourth symbol of the transport block may be mapped to the second subcarrier and to the second OFDM symbol, and/or the like According to an embodiment, mapping may also be provided and/or performed (e.g., done) over the OFDM symbols of a first time slot and then may be moved on to the next subcarrier until the first time slot may be full. Mapping may then be continued in the first subcarrier and over the OFDM symbols of the second time slot and may be moved on to the next subcarrier of that time slot, until the second time slot may be full.

In another example, the mapping of transport blocks to the resource grid may be done in a diagonal manner. For example, a first symbol of the transport block may be mapped to a first OFDM symbol and a first subcarrier. A second symbol of the transport block may be mapped to a second OFDM symbol and a first subcarrier. A third symbol of the transport block may be mapped to a first OFDM symbol and a second subcarrier. A fourth symbol of the transport block may be mapped to the third OFDM symbol and a first subcarrier. A fifth symbol of the transport block may be mapped to the second OFDM symbol and second subcarrier. A sixth symbol of the transport block may be mapped to the first OFDM symbol and third subcarrier. This may continue until the transport block may be completely mapped within the allocated bandwidth. Such an example may also be applicable by switching OFDM symbol with subcarrier and vice-versa and hence changing the direction of mapping. In an example, if the next symbol/subcarrier in the algorithm, function, method, or process may be beyond the subframe size (or bandwidth allocated) the mapping may continue on the last symbol and/or subcarrier and move up one subcarrier and/or symbol.

In examples, for example, where the mapping of symbols to resource elements of the resource grid may be modified such that the symbols of a code block may be spread over more than one, or all, available OFDM symbols, the mapping may also be provided and/or designed in such a way that the set of subcarriers that may be used by a code block may be spread uniformly over the allocated bandwidth so as to preserve frequency diversity. In addition, the set of subcarriers that may be used by a code block may be such that the interference from reference symbols of neighboring cells may be equally distributed between codeblocks.

The order of mapping of the subcarriers may be defined, for example, using one or more of the following. For example (e.g., to define the order of the mapping), subcarriers that may be filled consecutively may be separated by N or more subcarriers where N may be the number of codeblocks. Alternatively or additionally, the value of N may be obtained by at least one of the following: a PCI of the cell from which the PDSCH may be transmitted; a RNTI of a device; semi-static configuration provided by higher layer signaling such as RRC signaling; an indication in the downlink assignment (e.g., the value of N may be explicitly indicated in a DCI assigning resources for PDSCH); a mapping of a parameter of the downlink assignment to pre-configured values of N; and/or the like.

In an example (e.g., for the mapping parameter of the downlink assignment to preconfigured values of N), $n_{SCID}$ used for the generation of the DM-RS sequence may be mapped to a value of N. Further, in an example, the antenna port value may be mapped to a value of N. The bandwidth in resource blocks of the corresponding PDSCH transmission may be mapped to a value of N. According to another or additional example, the value of N may be determined by the redundancy version of the transport block.

Additionally (e.g., to define the order of the mapping), a mapping may be over symbols of a first subcarrier and the next subcarrier where the mapping may be based on or selected from a hopping function. For example, assuming 12 subcarriers in the BW allocation, the mapping may be first performed over symbols of subcarrier 0, then over symbols of subcarrier 5, then over symbols of subcarrier 8, and so on until the subcarriers have been exhausted. The subcarrier hopping function may be similarly configured as the step size N described herein.

Further (e.g., to define the order of the mapping), a mapping may be in increasing order of subcarrier within a physical resource blocks (PRBs), but the mapping order of PRBs within the allocated transmission may be modified to ensure that frequency diversity may be maintained within a codeblock. For example, if the set of PRBs of the allocated transmission consists of resource blocks indexed by {3, 4, 5, 6, 7, 8, 9, 10}, the mapping to resource elements may be performed according to the following order of PRBs: 3, 7, 4, 8, 5, 9, 6, 10. More generally, if the sequence N(p), with p=0

... P-1 may correspond to the P allocated PRB by increasing order, the mapping may be performed according to the sequence N'(q) where N'(q)=N(p) and p=(q mod K)×L+p div K, where K and L may be parameters and the operation p div K corresponds to taking the largest integer smaller than the ratio of p over K.

In the mapping examples described herein, a PDSCH may be mapped to REs where PDSCH symbols may not overlap with other symbols (e.g., such as RS symbols).

In some examples, an additional stage or phase of interleaving may be performed following code block concatenation. At the output of this additional stage or phase the stream of coded bits $h_0, h_1, \ldots h_{H-1}$ may be provided such that consecutive coded bits may not correspond to the same code block. For example, a block interleaver may be used such that if the input stream of bits may be denoted as $f_0, f_1, \ldots, f_{G-1}$, the output stream of bits may correspond to the following:

$$h_i = f_m$$

where m=E×(i mod C)+i div C. The parameters E and C may correspond to the number of coded bits of a codeblock and the number of codeblocks, respectively. The operation "i div C" may correspond to taking the largest integer smaller than the ratio of i over C. Alternatively or additionally, another type of interleaver, such as a random interleaver, may be used. Following the additional phase or stage of interleaving and code block concatenation, the coded bits may be processed according to the existing process stages or phases (e.g., scrambling, modulation, layer mapping, precoding and resource element mapping). The additional phase or stage of interleaving may effectively result in spreading the modulation symbols of a code blocks over different time symbols and subcarriers.

In an embodiment, a payload may be included in a downlink control channel. For example, data from a transport channel such as DL-SCH may be mapped into a physical downlink control channel such as PDCCH or E-PDCCH. Such an embodiment may be particularly suitable for the transfer of a small data payload.

Additionally, a transport channel data may be concatenated to downlink control information (DCI) prior to further physical channel processing. Such processing may include at least one or more of the following: CRC attachment, channel coding, and/or rate matching. The coded bits may be mapped to E-PDCCH (or PDCCH). In this embodiment, a grouping of downlink control information and transport channel data may be referred to as an "extended" DCI, or as a new DCI format.

A number of bits (e.g., such as zero bits or bits that may have a zero value) may also be appended to the combination of DCI and transport block data bits. For example, the number of bits may be a particular number of bits (e.g., the smallest suitable number) such that the total number of bits may not correspond to one of a set of number of bits. This set may represent numbers of bits for which the outcome of channel decoding may be ambiguous.

In an embodiment, a transport channel data may undergo at least part of a physical channel processing separately from DCI. For example, CRC attachment and channel coding may be performed independently on the DCI and on the transport channel data. In this embodiment, the number or proportion of coded bits and/or coded symbols that may be used by DCI and transport channel data may be pre-determined or signaled by higher layers. Additionally, the CRCs may have different sizes and may be masked with different RNTIs. The transport channel data may also be processed alone without DCI. The channel coding may include tail-bited convolutional coding or turbo coding.

According to an example (e.g., when transport channel data may be mapped on a downlink control channel along with DCI on the same PDCCH or E-PDCCH), at least a portion of DCI may be related to the transport channel data. For example, the DCI may include the following information: an indication of whether a transport block may be included, an indication of the size of the transport block, a new data indicator, a HARQ process number, a redundancy version, a TPC (transmit power control) command for PUCCH, a downlink assignment index (DAI), and/or a SRS request. In an embodiment, some or all of the above information may be pre-determined. Additionally, at least a portion of the DCI may also be related to an uplink grant, a downlink assignment on PDSCH (for other(s) transport block(s)), a TPC command, and/or other information.

In an embodiment, to reduce the complexity of UE decoding, at least one of the following solutions or embodiments may be adopted. The set of possible transport block sizes may be pre-determined (e.g., according to the format of the extended DCI) or provided by higher layers. The DCI along which transport channel data that may be multiplexed may be restricted to be according to one of a set of pre-determined DCI formats. Additionally, a PDCCH or E-PDCCH that may include transport channel data may be restricted to be transmitted over a specific subset of E-PDCCH set(s), over a specific subset of search spaces (e.g., common or UE-specific and/or for a specific subset of aggregation level(s)), or according to a minimum number of resource elements or symbols available to E-PDCCH or PDCCH.

Upon successful reception of the transport block, a device may transmit HARQ ACK over PUCCH (or PUSCH) according to the same rules as for reception from PDSCH. If the DCI and transport block may be separately processed and the DCI may be received successfully, but the transport block may not, the device may transmit HARQ NACK over PUCCH (or PUSCH).

The following may provide an example of a device operation according to the examples described herein. According to an embodiment, the device may get configuration information from higher layers. For example, the device may be configured to receive downlink data according to a certain transmission mode for which reception of transport channel data from E-PDCCH may be defined. The device may be configured to attempt E-PDCCH decoding using an extended DCI in its device-specific or UE-specific search space, possibly in a configured E-PDCCH set and for aggregation levels of 8 and/or 16. The size of the extended DCI (e.g., or of the combined DCI and transport block) may also be configured (e.g., if not pre-determined). The device may also be configured with a set of subframes over which reception of transport channel data from E-PDCCH may be possible.

In subframes where reception of transport channel data from E-PDCCH may be configured, a device may attempt decoding E-PDCCH in certain search spaces. The search spaces may be determined according to the same procedures as for normal DCI decoding. In at least one of the search spaces, the device may attempt blind decoding of an extended DCI (e.g., or combined DCI and transport block) assuming a total number of information bits corresponding to the sum of the combined DCI, a particular transport block size, and/or bits possibly added to avoid certain sizes. The device may further determine that decoding may be successful if the CRC may be masked with a certain RNTI such as its C-RNTI. The device may also attempt decoding E-PDCCH candidates assuming transmission of normal DCI as per existing procedures.

If a device may successfully decode an extended DCI or a combined DCI and transport block, the transport block may be delivered to higher layers. In addition, the device may take an action based on the received DCI such as triggering transmission of aperiodic SRS, adjusting its transmission power control, transmitting on PUSCH, and/or the like.

Stand-alone PDSCH reception (e.g., SA-PDSCH operation) may be provided and/or used. For example, in a small cell environment, radio characteristics of the channel for a given device may be less varying than for larger cells. In such an environment, scheduling flexibility and dynamicity may be less critical for a scheduler to maximize the use of resources, and instead improvements to control signaling may be possible.

An SA-PDSCH operation may be as follows. In an embodiment, SA-PDSCH and related characteristics may be defined. For example, improvements may be achieved by reducing or eliminating the amount of control signaling sent on PDCCH (or ePDCCH). In an embodiment, this may be achieved by having a device receive at least part of the scheduling information applicable to a PDSCH transmission on a resource of the PDSCH itself. For example, for some transmissions, the Downlink Control Information (DCI) may be mapped on the physical PDSCH channel (e.g., for downlink scheduling assignments, for activation/deactivation of resources, for control signaling pertaining to SPS-C-RNTI and/or for uplink scheduling grants), possibly together with the DL-SCH (e.g., in case of downlink scheduling assignment).

According to an embodiment, reception of PDSCH according to or based on SA-PDSCH reception may be combined with multi-subframe or cross-subframe scheduling. In such a mode of operation, part of DCI applicable to the PDSCH assignment may be included in a PDCCH or E-PDCCH received in a previous subframe, and/or the remaining part may be mapped on the PDSCH. For example, a resource block assignment and the modulation and coding scheme may be included in PDCCH or E-PDCCH of a previous subframe while the HARQ process number, the data indicator, the redundancy version, the TPC command for PUCCH and/or other fields of the DCI may be mapped on the PDSCH. In embodiments (e.g., as described herein), eDCI (embedded DCI) may be used to refer to the part of DCI mapped to PDSCH.

DCI and DL data in the same resource and/or in different resources may also be provided and/or used. For example, in an embodiment, a SA-PDSCH operation may be achieved either by receiving at least a part of the DCI and the downlink data separately in different resources (e.g., where a first resource may include the DCI, and a second resource may include the downlink data) or together (e.g., either interleaved or concatenated) in a common resource.

The DCI may indicate plural DL data allocations at different time instants such as multi-TTI scheduling. For example, an SA-PDSCH operation may be achieved by receiving a DCI in a first subframe (e.g., subframe n) where the DCI may provide control signaling for the same subframe (i.e. subframe n), for a subsequent subframe (e.g., subframe n+1 for a downlink assignment and/or subframe n+4 for an uplink grant), for a plurality of subframes (e.g., subframes [n, n+3]), and/or combinations thereof. Such DCI may include a single set or parameter (e.g., a resource allocation), or one or more sets of parameters (e.g., plural resource allocations) for either a single HARQ process such as for blind retransmissions of the same transport block and/or for a plurality of HARQ processes such as one for each HARQ process.

Additionally, DCI may support scheduling of multiple transmissions (e.g., it may include zero or more downlink assignments and/or zero or more uplink grants). For a DCI received in subframe n, the corresponding control information may be applicable to the same subframe (i.e. subframe n), for a subsequent subframe (e.g., subframe n+1 for a downlink assignment and/or subframe n+4 for an uplink grant), for a plurality of subframes (e.g., subframes [n, n+3]) and/or combinations thereof. This may be multi-subframe scheduling.

In examples, DCI may include additional parameters including, for example, at least one of the following: multi-subframe allocation indicator (MSAI), timing information (TI), and/or any other suitable parameter. For example, a multi-subframe allocation indicator (MSAI) field may be present in the DCI format (e.g., it may be present in case the DCI may explicitly indicate that it may include signaling information for a plurality of transmissions). Such a field or indicator may represent a value indicating that the same assignment may be valid for x consecutive subframes, and/or whether such assignment may be for a single HARQ process (e.g., for the indicated HARQ process ID), for a synchronous HARQ operation within the multi-subframe allocation (e.g., for HARQ processes starting with the indicated HARQ process ID at subframe n, for HARQ process ID+1 at subframe n+1 and so on up to HARQ process ID+x−1 at subframe n+x−1) and/or for different HARQ processes as indicated by a plural set of parameters (e.g., one for each HARQ process as possibly explicitely indicated by x number of HARQ process ID fields).

In an example, timing information (TI) (or equivalently a timing offset) field may be present in the DCI format (e.g., it may be present in case DCI may explicitly indicate timing information for the corresponding assignment). For example, such a field or indicator may include a value that may be a time offset, for example, between subframe n in which a device may receive the control information and the subframe for which the concerned allocation may be valid (e.g., subframe n+offset). Additionally, in an embodiment, the TI may be a two-bit field (value 0, 1, 2, 3) that may represent such an offset.

According to an example, DCI may use differential coding, for example, within the DCI format itself and/or from a configuration. For example, when multi-subframe scheduling may be supported, such a DCI may possibly implement differential coding, either implicitly (e.g., based on a configured allocation) or explicitly (e.g., the parameters may be present for the first allocation in the control signaling while for subsequent allocation if a parameter may be present then it may be used instead of the corresponding parameter of the previous or of the first transmission indicated in the multi-TTI scheduling information). Additionally, for example, when multi-subframe scheduling may be supported, such a DCI may include one or more sets of at least one of transmission parameter such as one for each SA-PDSCH assignment and/or grant. As such, a DCI that may schedule SA-PDSCH may have a one-to-many relationship (e.g., multi-subframe scheduling) and/or may have an indirect timing relationship (e.g., cross-subframe scheduling) with a SA-PDSCH transmission (e.g., one eDCI and one PDSCH).

Multi-subframe scheduling may be realized with a one-to-one relationship between a DCI and an eDCI, and a one-to-many relationship with a eDCI and SA-PDSCH transmission(s). In an example, the indirect timing relationship may be provided by eDCI.

As described herein, embedded DCI (eDCI) may also be provided and/or used. For example, eDCI may be defined and/or may include, provide, and/or use New Data Indicator (NDI), a HARQ process, Transmit Power Control (TPC) command, ACK/NACK Resource Indicator (ARI), Downlink Assignment Index (DAI), a Sounding Reference Signal (SRS) request, and/or the like encoded (e.g., separately encoded). The eDCI may transport downlink scheduling information, requests for aperiodic CQI reports for a cell and a RNTI. The RNTI may be implicitly encoded in the CRC of the eDCI. Additionally, the eDCI may transport uplink scheduling information.

The eDCI may include parameters that may not be provided to the device by dedicated signaling (e.g., for a semi-static configuration) or parameters that may be semi-statically configured, but that may be dynamically overridden by the eDCI. Such parameters may include at least one of the following: a carrier indicator, a resource allocation header, a resource block assignment, a TPC command for PUCCH, a downlink assignment index, a HARQ process number, a modulation and coding scheme and/or redundancy version, a new data indicator (NDI), a redundancy version, a SRS request, a CQI request, an ACK/NACK resource indicator (ARI), and/or the like.

For a carrier indicator, a field may be used where the field may be optionally present in the eDCI format (e.g., it may be present if eDCI may schedule DL-SCH on PDSCH of another serving cell of the device's configuration). Additionally, if present or used, this field may indicate the serving cell's SA-PDSCH configuration of the device's configuration the eDCI may be applicable for.

A resource allocation header may also include a field that may be provided and/or used. This field may be present in the eDCI format. For example, this field may be present if the total bandwidth of the SA-PDSCH allocation and/or if the total bandwidth of the PDSCH may be larger than 10 PRBs.

For a resource block assignment, a field may be provided and/or present in the eDCI format. In an example, the field may be absent in case the resource block assignment may semi-statically configured, if the configured assignment may not be dynamically overridden by eDCI reception, and/or if the eDCI and the DL-SCH bits may not be received on the same resource. If present or provided, the field may indicate what resources (e.g., in frequency) may be used to decode DL-SCH transmission on the concerned PDSCH (e.g., possibly according to other methods described herein).

In an embodiment, a TPC command for PUCCH may be provided and/or used. If present or provided, the device may interpret this field according to a legacy field of a DCI format used on PDCCH.

For a downlink assignment index (DAI), a field may be provided and/or present in the eDCI format (e.g., it may be present for TDD). If present or provided, a device may interpret this field according to legacy field of a DCI format that may be used on PDCCH.

In an example, a HARQ process number or HARQ process identifier (ID) may be provided and/or used. This field may be provided and/or present in the eDCI format. The field may also be omitted in case a specific HARQ process may be reserved and/or may be associated to a SA-PDSCH configuration and/or to a specific set of resource(s). If present or provided, a device may interpret this field according to legacy field of a DCI format used on PDCCH.

For a modulation and coding scheme and/or a redundancy version, a field may be provided and/or present in the eDCI format. This field may be omitted in case a semi-static MCS may be configured for the concerned resource. In an embodiment, there may be one such field per transport block for the applicable PDSCH transmission. If present or provided, a device may interpret this field according to legacy field of a DCI format used on PDCCH.

A data indicator such as a new data indicator (NDI) may also be provided and/or used as described herein. For example, in an embodiment, there may be a NDI field per transport block for the applicable PDSCH transmission. If present or provided, a device may interpret this field according to legacy field of a DCI format used on PDCCH. If absent, the device may determine whether or not the transmission may be for a new transport block as a function of the timing of the transmission (e.g., as a function of the periodicity of the initial HARQ transmission configured for the SA-PDSCH allocation).

For a redundancy version, there may be one such field per transport block for the applicable PDSCH transmission. If present or provided, the UE may interpret this field according to legacy field of a DCI format used on PDCCH.

In an embodiment, a SRS request may be provided and/or used. This field may be present and/or provided in the eDCI format. For example, the SRS request may be present and/or provided so eDCI may schedule both (or either) a downlink transmissions and an uplink transmissions. If present or provided, a device may interpret this field according to legacy field of a DCI format used on PDCCH.

A field may be provided and/or present for a CQI request in the eDCI format. In an example, if present and/or provided, a device may interpret this field according to legacy field of a DCI format that may be used on PDCCH.

Additionally, a ACK/NACK Resource Indicator (ARI) may be provided and/or used. This field may be provided and/or present in the eDCI format. For example, this field may be provided and/or present so eDCI may explicitly indicate a resource for the transmission of HARQ feedback on PUCCH for the concerned PDSCH transmission.

According to an example, eDCI may be separately encoded and transmitted on a resource associated with eDCI reception for a SA-PDSCH operation (e.g., as part of the UE's configuration) and/or it may be multiplexed together with DL-SCH data.

Additionally, in an embodiment, if multi-subframe scheduling may be supported by the eDCI control signaling, a DCI may schedule a SA-PDSCH where the SA-PDSCH may include an eDCI that may include control signaling in support of a multi-subframe operation for a plurality of SA-PDSCH transmissions. For example, an eDCI format may include parameters such as MSAI and/or TI as described above, and may also include information corresponding to multiple SA-PDSCH transmissions.

In examples, configurations of a SA-PDSCH operation may be provided and/or used. For example, methods to configure a device for a SA-PDSCH operation may be provided and/or used. In such embodiments, a device may be configured for a SA-PDSCH operation using dedicated signaling and/or procedures such as a RRC Connection Reconfiguration procedure and/or RRC signaling. In addition to the legacy PDSCH configuration, a device may be configured with at least one of the following parameters for SA-PDSCH: a resource block assignment for eDCI reception, a resource block assignment for DL-SCH reception, a resource block assignment for combined eDCI and/or DL-SCH reception, a HARQ process number, a modulation and coding scheme and/or redundancy version, a periodicity of the HARQ process, a PUCCH configuration for HARQ ACK/NACK for SA-PDSCH, a SAPDSCH C-RNTI, antenna port information, rank information, and/or the like.

For a resource block assignment for eDCI reception, a UE may be configured with a resource allocation for decoding of eDCI(s)) and, for a resource block assignment for a DL-SCH reception, the device may be configured with a resource allocation for decoding of a DL-SCH transmission on PDSCH while other parameters of SA-PDSCH may be scheduled by eDCI(s). In an embodiment, for a resource block assignment for combined eDCI and/or DL-SCH reception, a device may be configured with a resource allocation for the decoding of eDCI(s). In such an example, a successful decoding may enable the device to continue with decoding of DL-SCH transmission on the same resource while other parameters of SA-PDSCH may be scheduled by a corresponding eDCI). Additionally, for a HARQ process number, a device may be configured with a HARQ process number reserved for the concerned SA-PDSCH allocation. According to an example, for a modulation and coding scheme and/or redundancy version, a device may be configured with a MCS and RV, which may be applicable to the decoding of eDCI and/or DL-SCH transmission, where other parameters of SA-PDSCH may be scheduled by a corresponding eDCI and/or there may be a set of MCS for each of eDCI and DL-SCH transmissions (e.g., that may be indexed). For a periodicity of the HARQ process, a device may be configured with a period such that a subframe, for example, for which the SFN mod(period) may equal 0, may implicitly indicate that the device may determine or consider that the NDI may have toggled for the concerned HARQ process (e.g., each "period" of time).

According to an example embodiment, in a PUCCH configuration for HARQ ACK/NACK for SA-PDSCH, a device may be configured with a PUCCH allocation for HARQ feedback on PUCCH. This may be a PUCCH format 3 configuration, a set of PUCCH indices indexed by ARI, and/or another legacy semi-static configuration method for the concerned SA-PDSCH (or for the PDSCH). The PUCCH configuration may be applicable for the reception of DL-SCH for SA-PDSCH transmission (e.g., and/or related activation signaling). As such, for a PDSCH transmission scheduled according to legacy methods, a device may transmit PUCCH feedback according to legacy methods (e.g., with HARQ resources determined from parameters of the downlink assignment).

For a SAPDSCH-C-RNTI, a device may be configured with a RNTI. The device may use such a RNTI for the decoding of DCI(s) on PDCCH and/or to determine which DCI may activate the SA-PDSCH operation. Such a DCI may include an index corresponding to a SA-PDSCH configuration or related aspects such as resources for decoding eDCI and/or DL-SCH data and/or for PUCCH transmissions, MCS, and/or the like. In an embodiment (e.g., when, possibly, a second RNTI may be configured), the device may use such RNTI for decoding of eDCI(s) on a resource allocated for eDCI decoding on PDSCH and/or which eDCI may activate the SA-PDSCH operation. Such an eDCI may include an index corresponding to a SA-PDSCH configuration or related aspects such as resources for decoding of DL-SCH data and/or for PUCCH transmissions, MCS, and/or the like.

According to an example (e.g., for antenna port information), a device may be configured with antenna port information applicable for PDSCH reception on one or more sets of configured resources. For example, the same antenna port information may be applicable to the resources configured for the concerned PDSCH. Each set of resource(s) may be configured with a specific antenna port information. The antenna port information may include at least one of a scrambling identity, a number of layers indication, an antenna port(s) indication and/or quasi-colocated antenna ports. The device may use the antenna port applicable to a concerned resource to determine the location of the reference signals.

For rank information, a device may be configured with a rank applicable for PDSCH reception on one or more sets of configured resources. For example, the same rank may be applicable to each of the resources configured for the concerned PDSCH. Additionally, each set of resource(s) may be configured with a specific rank. The device may use the rank indication to determine the number of antenna ports associated with the reception of a transmission on the concerned resource(s).

In an example (e.g., when multi-subframe scheduling may be supported), a device may be configured with at least one of the following parameters for SA-PDSCH: MSAI, TI, and/or the like. Using a multi-subframe allocation indicator (MSAI), a device may be configured for multi-subframe allocation for reception of DCI (or eDCI). For example, if configured for such a multi-subframe allocation, the device may attempt decoding of one or more DCI format(s) applicable to control signaling for multi-subframe allocations. For example, the device may determine that a DCI received is applicable for multiple allocations according to one or more of the methods described herein and applicable to multi-subframe scheduling.

Using timing information (TI) (or equivalently a timing offset), a device may be configured for multi-subframe allocation with timing information pertaining to such an allocation. For example, the device may be configured with the number of subframes and/or the identity of the subframes (e.g., within a given period such as a radio frame) for the multi-subframe allocation. In an example, the device may be configured with explicit timing information for assignments received for, for example, a given DCI format. Additionally, the device may be configured with a value that may be a time offset, for example, between subframe n in which the device may receive the control information and the subframe for which the concerned allocation may be valid (e.g., subframe n+offset). For example, the TI may be a two-bit field (value 0, 1, 2, 3) that may represent such an offset.

Scheduling in time for SA-PDSCH transmissions may be provided and/or used. For example, methods, processes, and/or actions to determine the subframe for the allocation and/or reception of a transmission on SA-PDSCH may be provided and/or used. In an embodiment, once configured for a SA-PDSCH operation, a device may consider the subframes applicable for SA-PDSCH operation. Additionally, the device may determine that a subframe may be applicable for SA-PDSCH scheduling according to at least one of the following (e.g., methods or actions).

A device may make such a determination based a semi-static configuration. For example, the device may receive timing parameters including a frame configuration, for example, in the form of an offset to determine applicable radio frame(s) (e.g., according to SFN mod(period)=offset where period represents a periodicity of period*10 ms), a subframe configuration, for example, in the form of a bitmap indicating one or more subframe in the concerned radio frame(s), and the like. In an embodiment, such a subframe configuration may represent a subframe in which the device may attempt to decode eDCI. Additionally, the device may consider the subframe configuration to be applicable to the initial HARQ transmission for a specific process and may receive additional timing information such as HARQ process periodicity for retransmissions.

A device may further make such a determination based on an indication from the DCI that may be decoded in a previous subframe. For example, the device may determine that an eDCI may be mapped on the PDSCH if it may receive an indication in a previous subframe. The indication may be obtained from a field of a DCI decoded from a PDCCH or E-PDCCH or eDCI in PDSCH that may be received in this previous subframe.

According to an example, a device may make such a determination based on a semi-static configuration with activation and/or deactivation (e.g., for SA-PDSCH operation). For example, in addition to a subframe configuration, the device may receive control signaling (e.g., on PDCCH or E-PDCCH) that may active the SA-PDSCH configuration. The corresponding control signaling may indicate one or more resource allocation(s) for eDCI, DL-SCH reception, for PUCCH transmissions, and/or for other related parameters (e.g., one more parameters and/or contents of the eDCI, for example, described herein).

A device may also make such a determination based on a semi-static configuration with activation and/or deactivation of multi-subframe operation (e.g., for SA-PDSCH operation). For example, the device may determine that an eDCI may be mapped on the PDSCH if it may receive an indication in a previous subframe. The indication may be obtained from a field of a DCI decoded from a PDCCH or E-PDCCH or eDCI in PDSCH that may be received in this previous subframe.

In an embodiment, a device may further make such a determination based on a DRX Active Time (e.g., each of the subframes while in DRX Active Time). For example, once a device may be configured for SA-PDSCH operation and/or once the configuration may be activated, the device may consider the subframes that may be part of DRX Active Time as applicable to a SA-PDSCH operation (e.g., if DRX may also be configured).

Additionally, a combination of the above (e.g., semi-static configuration, an indication from the DCI, semi-static configuration with activation/deactivation, and/or DRX active time) may be used for such a determination. As such, the subframes of pattern when activated and in DRX Active Time may be used for the determination. In such an embodiment, once a device may be configured for a SA-PDSCH operation and/or once the configuration may be activated, the device may consider the subframes that may be part of the SA-PDSCH subframe configuration and that may also be part of the UE's DRX Active Time as applicable to a SA-PDSCH operation (e.g., if DRX may also be configured).

If DRX may be configured, for the purpose of maintaining (e.g., start, reset, and/or stop) timers applicable to DRX, a device may consider successful reception of eDCI on PDSCH as equivalent to successful reception of a DCI on PDCCH. As such, DRX operation may be applicable to eDCI decoding.

Additionally, a device may disable and/or release a SA-PDSCH configuration upon expiration of TAT, upon detection of radio link problems, upon detection of radio link failure, and/or upon similar impairments.

Resource allocation for downlink control signaling may be provided and/or used. For example, methods, processes, and/or actions to allocate resources for the eDCI (e.g., where the eDCI includes resource allocation for a PDSCH transmission) may be provided and/or used. In such an embodiment, a single resource for eDCI may be provided and/or used. For example, if the device may be configured with a single resource allocation for eDCI reception in a subframe applicable to SA-PDSCH, the device may perform blind decoding of the applicable eDCI(s) in the concerned resource until it may successfully decode a eDCI or until the attempts may be exhausted. In an example, the device may attempt one blind decoding per applicable eDCI size and/or applicable RNTI. For each eDCI size, the device may also attempt one blind decoding per configured set of decoding parameters.

Additionally, multiple resources for eDCI may be provided and/or used. If a device may be configured with a plurality of resource allocations for eDCI reception in a subframe applicable to SA-PDSCH, the device may perform blind decoding similar to the examples herein for each resource allocation until it may successfully decode an eDCI or until the resources may be exhausted. The device may use the identity of the resource allocation for which eDCI decoding may have succeeded for additional information such as to determine the PUCCH resource for the transmission of corresponding HARQ feedback.

Explicit allocation from PDCCH or E-PDCCH received in previous subframe may also be provided and/or used. For example, a device may determine the resource block allocation of the PDSCH including the eDCI from the DCI that may be received in a previous subframe in PDCCH, E-PDCCH, or eDCI in PDSCH. In an embodiment, for each resource, the device may attempt blind decoding using a different set of parameters (e.g., eDCI size).

Resource allocation for downlink data may also be provided and/or used. For example, methods, processes, and/or actions to allocate resources for the PDSCH, for example, when eDCI and PDSCH may not be interleaved together and/or may not be in adjacent resources may be provided and/or used. In such an example, once a device may have successfully received an eDCI, the device may decode the DL-SCH transmission(s) according to the parameters of the corresponding eDCI.

In additional examples, resource allocation for combined eDCI and downlink data may be provided and/or used. For example, methods, processes, or actions to allocate resources for the eDCI and the PDSCH, for example, in case eDCI and PDSCH may be interleaved together and/or in adjacent resources may be provided and/or used. If a device may be configured such that eDCI and DL-SCH transmission(s) may be received in the same resource allocation, the device may de-multiplex (e.g., deinterleave) a set of bits corresponding to an eDCI format from the concerned resource and may then attempt decoding the eDCI.

The device may perform blind decoding attempts for applicable eDCI(s) in the concerned resource until it may successfully decode an eDCI or until the attempts may be exhausted. In an embodiment, the device may attempt one blind decoding per applicable eDCI size and/or applicable RNTI. Additionally, for each eDCI size, the device may attempt one blind decoding per configured set of decoding parameters and may decode PDSCH in the allocated resource. In an example, if the device may be configured with multiple resource allocations for combined eDCI and DL-SCH transmission(s), the device may repeat the above for each set or resource(s) until it may successfully decode the applicable eDCI or until the attempts may be exhausted.

Once a device may successfully decode an eDCI on one resource, the device may stop attempting decoding eDCI on other resources. Additionally, for each of the resources herein (e.g., the above resources), the device may attempt blind decoding using a different set of parameters (e.g., an eDCI size).

According to an example, a general processing structure for each transport block for the DL-SCH transport channel may be similar to the legacy structure. Such a general processing structure may be as follows. For example, data may arrive to the coding unit in the form of a maximum of two transport blocks each transmission time interval (TTI) per DL cell. One or more of the following coding actions may be identified for each transport block of a DL cell: adding CRC to the transport block, code block segmentation and code block CRC attachment, channel coding, rate matching, code block concatenation, and/or the like.

Additionally, in an embodiment, a general processing structure for a DCI may include one or more of the following coding actions that may be identified similar to the legacy structure: information element multiplexing, CRC attachment, channel coding, rate matching, and/or the like.

For SA-PDSCH transmissions, the general processing may include multiplexing of DCI rate matched bits with rate matched DL-SCH bits that may then be interleaved before transmission on the physical channel. Additionally, the respective bits may be received in different resources, either adjacent or separate, in which case no deinterleaving between bits for eDCI and bits for DL-SCH transmission(s) may be used or needed.

Mapping of HARQ feedback on PUCCH may also be provided and/or used. For example, methods, processes, and/or actions to determine where to send HARQ A/N on PUCCH (e.g., in subframe n+4 for eDCI reception in subframe n) may be provided and/or used. In an example, a device may be configured with a semi-static resource allocation of transmission of HARQ feedback on PUCCH. Additionally, the device may dynamically determine the resource for PUCCH according to at least one of the following: ARI that may be received in eDCI (e.g., the device may determine that the PUCCH index for HARQ A/N feedback transmission may be a function of the ARI indicated in the eDCI that may be received for SA-PDSCH); ARI that may be received in DCI that may activate SA-PDSCH (e.g., the device may determine that the PUCCH index for HARQ A/N feedback transmission may be a function of the ARI indicated in the DCI that may activate the SA-PDSCH); based on an index of a resource in which eDCI possibly including a downlink assignment may have been successfully decoded (e.g., the device may determine that the PUCCH index for HARQ A/N feedback transmission may be a function of the index of the resource in which eDCI may have successfully decoded for SA-PDSCH); and/or the like.

In an example embodiment, a timing of UCI associated with a control signaling received in an eDCI may be a function of the timing of each allocation, or of the last allocation of the eDCI. For example, when multi-subframe scheduling may be supported, the transmission of HARQ feedback (or more generally, of the corresponding UCI) for a concerned allocation may be performed according to at least one of the following.

In an example, the transmission for HARQ feedback may be performed using a single UCI transmission per multi-subframe DCI/eDCI. For example, a device may determine that the UCI may be transmitted in the same resource for each of the received downlink data assignment (e.g., either in the same subframe using concatenation, bundling, multiplexing or in separate subframes). Additionally, the concerned DCI may include a single AR, for example, in a resource that the device may determine according to any of the methods described herein (e.g., as a function of ARI and/or as a function of an index to a resource in which the concerned DCI may have been successfully decoded). Additionally (e.g., for a single UCI transmission per multi-subframe DCI/eDCI), the device may determine the timing of the transmission of the UCI associated to, for example, a downlink assignment as a function of the subframe corresponding to a specific assignment of the control signaling (e.g., as a function of the subframe corresponding to the last assignment indicated in the control signaling such as the concerned DCI).

The transmission for HARQ feedback may also be performed using a single UCI transmission for each assignment in the multi-subframe DCI/eDCI. For example, a device may determine that the UCI may be transmitted in the resource that corresponds to the ARI associated with the concerned assignment (e.g., in case the device may receive one such ARI per assignment in the concerned DCI format or using methods described herein and/or applied for a given assignment). Additionally (e.g., for the single UCI transmission for each assignment in the multi-subframe DCI/eDCI), the device may determine the timing of the transmission of the UCI associated with, for example, a downlink assignment as a function of the subframe in which the assignment may have been valid.

According to an example, if a starting point may be from SPS, one or more parameters may be moved to the DCI attached to the PDSCH transmissions. For example, some of the HARQ information may be moved. Additionally, in an example, if a starting point may be from dynamic scheduling, the amount of blind decodings may be restricted, for example, defining areas in the PRB map where a PRB may be a resource in time/frequency or areas in frequency.

A RRC configuration, SPS activation that may indicate a region, and/or the like may be provided and/or used. A DCI in beginning of PRB regions may also be provided and/or used. As such, a combined scheduling for multiple devices where, for example, each device may have a PRB area, a same RNTI, and/or DCI on PDCCH with RNTI may tell the devices that they may be scheduled, so they may blind decode in their respective area.

Sub-resource-block allocations may be provided and/or used in an embodiment. For example, PDSCH may be transmitted to one or more devices over a pair of resource blocks (e.g., a RB pair) and/or the transmissions to different devices may occupy different sets of resource elements of the RB pair. Such multiplexing with finer granularity may reduce overhead when the amount of data to be transferred to each device may be small. In embodiments (e.g., as described herein), a PDSCH transmission allowing multiplexing may be a sub-RB-pair transmission.

As described herein, a RB-pair may refer either to a pair of physical resource blocks (PRBs) or virtual resource blocks (VRBs). The virtual resource blocks may be of the localized type or the distributed type. Additionally, a sub-RB-pair transmission may be over a subset of the subcarriers of each RB comprising a RB pair. For example, the transmission may be over the six upper sub-carriers, or the six lower sub-carriers, of each RB of the RB pair. In an embodiment, a sub-RB-pair transmission may be over a single time slot of the RB pair (e.g., equivalently the transmission may take place over a single RB of the RB pair). A sub-RB-pair transmission may be over a subset of the OFDM symbols of the RB pair where the subset may be defined by an end OFDM symbol (e.g., in addition to a start OFDM symbol) and/or a sub-RB-pair transmission may be over resource elements characterized by a combination of the above. For example, the transmission may be over the second time slot (or second RB) and on the six upper sub-carriers.

A reception procedure may also be provided, used, and/or performed. For example, for a device configured to receive PDSCH transmissions using sub-RB-pair allocations, at least a subset of the following may be allowed. In an embodiment, a PDSCH transmission may include (e.g., full) RB-pair allocations (e.g., as in the current system). This may be a regular allocation.

Additionally, a PDSCH transmission may include a single sub-RB-pair transmission in a specific RB-pair. This may be a single sub-RB-pair allocation.

In an embodiment, a PDSCH transmission may include a set of (e.g., full) RB pairs and a certain number of sub-RB-pair transmissions. In this embodiment, the location of the sub-RB-pair transmission(s) of PDSCH may be constrained to be in certain RB pairs. For example, the sub-RB-pair transmission(s) may be possible in a first indicated RB pair and/or in a last indicated RB pair. This may be a mixed allocation.

Furthermore, a PDSCH transmission may include an unconstrained set of sub-RB-pair transmissions within different RB pairs. This may be a multiple sub-RB-pairs allocation.

A specific sub-RB-pair transmission (e.g., within the whole bandwidth) may be indicated using one or more of the following. For example, a first index to an RB-pair (e.g., a RB number) and a second index to one of a set of possible locations within an RB-pair (e.g., a sub-RB number) may be provided and/or used. In such an embodiment, in case N sub-RB-pair transmissions may be possible within a RB-pair, the transmission may be indicated by a RB number ranging from 0 to the total number of RBs (e.g., 110 for 20 MHz bandwidth) along with a sub-RB number ranging from 0 to N−1. Additionally, a single index to a sub-RB-pair transmission (e.g., a global sub-RB number) may be provided and/or used. For example, if the bandwidth may be M RBs and there may be N sub-RB-pair transmissions per RB, a specific sub-RB-pair transmission may be indicated by an index (e.g., a single index) ranging from 0 to M×N−1.

In subframes where a device may be configured to receive PDSCH using sub-RB-pair allocations (e.g., via at least one of the above embodiments), the device may determine the PDSCH allocation using at least one of the following. For example, the device may be indicated the type of allocation (e.g., as defined herein) from a DCI that may be received in the same (or a previous) subframe, or from higher layer signaling. In such an embodiment, a field of the DCI may indicate if the allocation may include a single sub-RB-pair allocation or of a regular allocation. The DCI may be received in PDCCH, E-PDCCH or PDSCH.

Additionally, a device may be indicated a set of RB pairs where sub-RB-pair allocations exist or may exist from DCI or from higher layer signaling. For example, a field of the DCI may indicate a specific RB pair among a set of RB pairs configured by higher layers or within the whole bandwidth.

In embodiments, a device may be indicated a specific sub-RB-pair allocation within a RB pair from DCI or higher layer signaling; the device may attempt blind decoding PDSCH in different possible locations of a sub-RB-pair allocation in a RB-pair where a sub-RB-pair allocation exists or may exist based on DCI or higher layer signaling; the device may be indicated a set of sub-RB-pair allocations within the whole bandwidth from DCI signaling using, for example, a bitmap; and/or the like.

Device-specific such as UE-specific demodulation reference signals may be provided and/or used. For example, to allow for sub-RB decoding, a device may be configured to estimate the channel via DM-RS. DM-RS design for sub-RB allocations may be modified to allow for the decrease of DM-RS overhead as well as the operation of multiple devices within one pair of PRB.

To allow for multiple devices to estimate their channels via DM-RS, one of the following DM-RS designs examples may be used when sub-RB allocation may be used. For example, if the total number of transmission layers for one or more devices allocated within a RB may be less than or equal to 8, each device may be configured to receive DM-RS by being indicated in its downlink assignment DCI the appropriate DM-RS ports (as well as a DM-RS to PDSCH port mapping). For example, a first device may be configured with ports 7, 8, 9 and 10, while a second device may be configured with ports 11 and 12. The DM-RS to PDSCH port mapping may be included in the downlink assignment DCI or may be higher layer signaled. In another or additional example, DM-RS ports to be used in sub-RB allocation mode may be semi-statically signaled to each device via higher layer signaling.

Additionally, DM-RS in a PRB may be intended for one or more devices scheduled with sub-RB allocation within that PRB and may use a pre-determined pre-coder that may be configured for the devices. In such an embodiment, the network may explicitly indicate to each device in their downlink assignment DCI the precoder that may be used for their individual PDSCH (e.g., the precoding that should or may be overlaid onto the DM-RS). In this embodiment, each device may be configured with transmission of up to 8 ports.

In a DM-RS example design (e.g., a Rel-11 DM-RS design), DM-RS for each port may be repeated over three subcarriers, each separated by 5 subcarriers (e.g., DM-RS port 7 may be located in subcarriers 1, 6 and 11). A device with sub-RB allocation of a subset of subcarriers may be configured to estimate the channel on DM-RS located within the subcarriers of the sub-RB allocation. This may enable or allow up to three devices to receive sub-RB PDSCH for up to 8 ports each.

In an example, for sub-RB allocation segregated in time slots, DM-RS that may be configured for a device may be transmitted in the appropriate time slot. Due to the orthogonal cover code design of DM-RS, such an example may enable or allow up to 4 ports per device per time slot. For example, DM-RS ports 7, 8, 9 and 10 may be configured for a device in the first time slot, and DM-RS ports 11, 12, 13 and 14 may be configured for a device in the second time slot. In an example method, a DM-RS port may not need to be repeated over three subcarriers. The network may, therefore, reuse the DM-RS REs to increase the DM-RS capacity per time slot. For example, in the first slot, subcarriers 0 and 1 (e.g., in OFDM symbols 5 and 6) may be used for 4 ports, subcarriers 5 and 6 (e.g., in OFDM symbols 5 and 6) may be used for another 4 ports, and/or subcarriers 10 and 11 (e.g., in OFDM symbols 5 and 6) may be used for another 4 ports. The same may apply in OFDM symbols 12 and 13 of the second time slot for another 12 ports in total.

Additionally, for mixed allocation or multiple sub-RB allocation, a device may estimate the channel on a subset of the RBs allocated. In such an embodiment, a device may be configured such that for the RBs where it may have sub-RB allocation, the device may estimate the channel based on the DM-RS of adjacent RBs. For example, a device may be scheduled for a full RB pair and a sub-RB pair. It may be configured with DM-RS in the RB where it may have full allocation and it may be signaled in its downlink assignment to use that DM-RS to estimate the channel in the RB pair where it may have sub-RB allocation. The configuration of such adjacent RB DM-RS may be explicitly signaled in the downlink assignment or may be higher-layer configured such that the device may look to an adjacent RB when it may have mixed or multiple sub-RB allocation. For an example, where there may be multiple sub-RB allocation, the device may be configured with some anchor RBs where even though they may have sub-RB allocation, they also include DM-RS.

Reduced HARQ feedback latency may also be provided as described herein. For example, a device receiving PDSCH according to a sub-RB-pair allocation in sub-frame n may provide HARQ feedback pertaining to this PDSCH transmission in sub-frame n+kr where the value of kr may be different (e.g., smaller) than the value of k applicable for the provision of HARQ feedback in subframe n+k used in a system (e.g., a current system). In an embodiment, in an FDD operation, k may be equal to 4. The value of kr may be set to 2. Such a faster HARQ operation may be beneficial to reduced transmission latency in the small cell.

The provision of HARQ feedback with reduced latency (e.g., in subframe n+kr instead of n+k, where kr<k) may occur, for example, when one, or a combination of at least one of the following conditions may be satisfied: a device may be configured to attempt reception of a sub-RB-pair allocation; the device may have received a certain type of sub-RB-pair allocation in subframe n (e.g., the device may transmit HARQ feedback in n+kr if it may have received a single sub-RB-pair allocation in subframe n); the device may not have received a regular allocation in subframe n; the device may not receive a regular allocation in subframe n−k+kr for which there may be conflict for the provision of HARQ feedback; the location of a received sub-RB-pair allocation may be in a RB-pair (e.g., the device may transmit HARQ feedback in n+kr if the sub-RB-pair allocation (or the sub-RB-pair allocations) may be or may have been in the first slot of the RB pair, or if the highest OFDM symbol in which PDSCH may have been received in subframe n may be smaller than a threshold); the total amount of resource elements or RBs in which PDSCH may be received may be smaller than a threshold; the sizes of the transport blocks that may be received in the allocation may be smaller than a threshold; and/or the like.

In an example such as when a device may provide HARQ feedback in subframe n+kr on PUCCH, the PUCCH resource may be determined according to one or more of the following: a resource that may be determined from the PDSCH transmission in subframe n (e.g., an ARI that may be received in a downlink control signaling applicable to a PDSCH transmission in subframe n); a resource that may be determined from the PDSCH transmission in subframe n+kr−k, if such PDSCH transmission may have been received in subframe n+kr−k and if such transmission may not have satisfied the condition(s) for provision of HARQ feedback with reduced latency; and/or the like.

According to an example, a device may provide HARQ feedback in subframe n+kr applicable to both PDSCH received in subframe n and PDSCH received in subframe n+kr-k if the PDSCH received in subframe n+kr-k may not satisfy the condition(s) for a provision of HARQ feedback with reduced latency. In this embodiment, the HARQ information pertaining to both subframes may be concatenated prior to transmission on PUCCH or PUSCH.

Although the terms UE or WTRU may be used herein, it may and should be understood that the use of such terms may be used interchangeably and, as such, may not be distinguishable.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU), comprising:
a processor configured to:
receive a physical downlink control channel (PDCCH) transmission comprising scheduling information for a downlink shared channel transmission;
determine a modulation and coding scheme (MCS) for the downlink shared channel transmission based on a first set of MCS values or a second set of MCS values, wherein the first set of MCS values comprises at least one MCS value corresponding to a modulation order of QPSK (Quadrature Phase Shift Keying), 16QAM (Quadrature Amplitude Modulation), or 64QAM, wherein the second set of MCS values comprises at least one MCS value corresponding to a modulation order of 256QAM, and wherein whether the first or second set of MCS values is used to determine the MCS is based on at least one of a scrambling identity associated with the PDCCH transmission, a format of the PDCCH transmission, or a search space associated with the PDCCH transmission; and
decode the downlink shared channel transmission based on the determined MCS.

2. The WTRU of claim 1, wherein at least one of the first set of MCS values or the second set of MCS values is configured for the WTRU by a network.

3. The WTRU of claim 1, wherein the scrambling identity comprises a cell radio network temporary identifier (C-RNTI).

4. The WTRU of claim 3, wherein the processor is configured to:
determine the MCS for the downlink shared channel transmission based on the first set of MCS values if a cyclic redundancy check (CRC) of the PDCCH transmission is scrambled with a first radio network temporary identifier (RNTI) value; and
determine the MCS for the downlink shared channel transmission based on the second set of MCS values if the CRC of the PDCCH transmission is scrambled with a second RNTI value.

5. The WTRU of claim 1, wherein the processor is further configured to:

select a channel quality index (CQI) value for channel state information (CSI) reporting, wherein the CQI value is comprised in one of a plurality of sets of CQI values, wherein at least a first set of the plurality of sets of CQI values comprises CQI values mapped to a modulation order corresponding to QPSK, 16QAM, or 64QAM, and wherein at least a second set of the plurality of sets of CQI values comprises CQI values mapped to a modulation order corresponding to 256QAM.

6. The WTRU of claim 5, wherein the processor is further configured to receive a CSI reporting configuration indicating which one of the plurality of sets of CQI values is to be used for CSI reporting in a reporting instance.

7. The WTRU of claim 6, wherein the CSI reporting configuration further indicates which one of the plurality of sets of CQI values is to be used for periodic CSI reporting.

8. The WTRU of claim 1, wherein the PDCCH transmission comprises downlink control information.

9. The WTRU of claim 1, wherein the downlink shared channel transmission is received over a subset of resource elements comprised in one or more resource block pairs, the one or more resource block pairs comprise a plurality of subcarriers, and the subset of resource elements are comprised in a subset of the plurality of subcarriers.

10. The WTRU of claim 9, wherein the one or more resource block pairs comprise a plurality of orthogonal frequency division multiplexing (OFDM) symbols, and the subset of resource elements are comprised in a subset of the plurality of OFDM symbols.

11. A method implemented by a wireless transmit/receive unit (WTRU), the method comprising:
receiving a physical downlink control channel (PDCCH) transmission comprising scheduling information for a downlink shared channel transmission;
determining a modulation and coding scheme (MCS) for the downlink shared channel transmission based on a first set of MCS values or a second set of MCS values, wherein the first set of MCS values comprises at least one MCS value corresponding to a modulation order of QPSK (Quadrature Phase Shift Keying), 16QAM (Quadrature Amplitude Modulation), or 64QAM, wherein the second set of MCS values comprises at least one MCS value corresponding to a modulation order of 256QAM, and wherein whether the first or second set of MCS values is used to determine the MCS is based on at least one of a scrambling identity associated with the PDCCH transmission, a format of the PDCCH transmission, or a search space associated with the PDCCH transmission; and;

decoding the downlink shared channel transmission based on the determined MCS.

12. The method of claim 11, wherein at least one of the first set of MCS values or the second set of MCS values is configured for the WTRU by a network.

13. The method of claim 11, wherein the scrambling identity comprises a cell radio network temporary identifier (C-RNTI).

14. The method of claim 13, wherein the MCS for the downlink shared channel transmission is determined based on the first set of MCS values if a cyclic redundancy check (CRC) of the PDCCH transmission is scrambled with a first radio network temporary identifier (RNTI) value, and wherein the MCS for the downlink shared channel transmission is determined based on the second set of MCS values if the CRC of the PDCCH transmission is scrambled with a second RNTI value.

15. The method of claim 11, further comprising:
selecting a channel quality index (CQI) value for channel state information (CSI) reporting, wherein the CQI value is comprised in one of a plurality of sets of CQI values, wherein at least a first set of the plurality of sets of CQI values comprises CQI values mapped to a modulation order corresponding to QPSK, 16QAM, or 64QAM, and wherein at least a second set of the plurality of sets of CQI values comprises CQI values mapped to a modulation order corresponding to 256QAM.

16. The method of claim 15, further comprising receiving a CSI reporting configuration indicating which one of the plurality of sets of CQI values is to be used for CSI reporting in a reporting instance.

17. The method of claim 16, wherein the CSI reporting configuration further indicates which one of the plurality of sets of CQI values is to be used for periodic CSI reporting.

18. The method of claim 11, wherein the PDCCH transmission comprises downlink control information.

19. The method of claim 11, wherein the downlink shared channel transmission is received over a subset of resource elements comprised in one or more resource block pairs, the one or more resource block pairs comprise a plurality of subcarriers, and the subset of resource elements are comprised in a subset of the plurality of subcarriers.

20. The method of claim 19, wherein the one or more resource block pairs comprise a plurality of orthogonal frequency division multiplexing (OFDM) symbols, and the subset of resource elements are comprised in a subset of the plurality of OFDM symbols.

* * * * *